(12) United States Patent
Zhang

(10) Patent No.: US 8,144,422 B2
(45) Date of Patent: Mar. 27, 2012

(54) AIR BEARING SURFACE METHOD AND APPARATUS OPTIMIZING FLYING HEIGHT ON DEMAND EFFICIENCY DURING FLYING HEIGHT ON DEMAND ACTIVITY OF SLIDER IN A HARD DISK DRIVE

(76) Inventor: Shuyu Zhang, Fremont, CA (US)

( * ) Notice: Subject to any disclaimer, the term of this patent is extended or adjusted under 35 U.S.C. 154(b) by 1285 days.

(21) Appl. No.: 11/561,406

(22) Filed: Nov. 19, 2006

(65) Prior Publication Data
US 2008/0117550 A1 May 22, 2008

(51) Int. Cl.
*G11B 21/02* (2006.01)
(52) U.S. Cl. .................................................. 360/97.01
(58) Field of Classification Search ................ 360/236.3
See application file for complete search history.

(56) References Cited

U.S. PATENT DOCUMENTS

| | | | |
|---|---|---|---|
| 2006/0034014 A1* | 2/2006 | Kato et al. | 360/128 |
| 2006/0238922 A1* | 10/2006 | Hanyu | 360/235.8 |
| 2007/0297085 A1* | 12/2007 | Zhang et al. | 360/75 |

* cited by examiner

*Primary Examiner* — Mark Blouin

(57) ABSTRACT

A slider including air bearing surface with Flying height On-Demand (FOD) protrusion with method of controlling airflow to maximize FOD efficiency as ratio of change in vertical position to protrusion height. Slider including components controlling the air flow to maximize FOD efficiency and/or including specific components minimizing an air bearing pressure under a Flying height On Demand (FOD) operation away from a maximum air bearing pressure, placing a peak pressure off of an FOD area create by a FOD protrusion, and shrinking a high peak pressure area of the air bearing surface. Hard disk drive includes head stack assembly, which includes head gimbal assembly, which includes the slider. Manufacturing method for slider, head gimbal assembly, head stack assembly and hard disk drive, and these items as products of these processes.

15 Claims, 18 Drawing Sheets

Air bearing surface 92, PTPH03

Air bearing surface 92, PLP01

Air bearing surface 92, MPP02

Air bearing surface 92, PBA01

Air bearing surface 92, PBA02

AIR BEARING SURFACE METHOD AND APPARATUS OPTIMIZING FLYING HEIGHT ON DEMAND EFFICIENCY DURING FLYING HEIGHT ON DEMAND ACTIVITY OF SLIDER IN A HARD DISK DRIVE

TECHNICAL FIELD

This application relates to an air bearing surface of a slider accessing a rotating disk surface in a hard disk drive, in particular to controlling air flow over the air bearing surface during a Flying height On Demand (FOD) operation using an FOD protrusion on the air bearing surface.

BACKGROUND OF THE INVENTION

The Flying height On Demand (FOD) protrusion deforms an air bearing surface, which changes air bearing pressure and the slider flying attitude. While this is generally known, knowing what to optimize is not. A performance metric is needed which can be used to optimize air bearing surfaces and FOD protrusion of these air bearing surfaces.

SUMMARY OF THE INVENTION

One aspect of this application is a method of controlling air flow over the air bearing surface of a slider during a Flying height On Demand (FOD) operation of the slider over a rotating disk surface in a hard disk drive. As used herein the FOD operation includes the formation of an FOD protrusion on the slider, which deforms the air bearing surface. This deformation of the air bearing surface changes the air bearing pressure map and the slider flying height, or vertical position over the rotating disk surface. The FOD efficiency was calculated as the vertical position change divided by the height of the FOD protrusion.

The method includes providing an air bearing surface with an FOD protrusion subject to airflow near a rotating disk surface to create an FOD airflow over the air bearing surface with maximum FOD efficiency. Providing the air bearing surface further includes minimizing the air bearing pressure under the FOD, placing a peak pressure off of the FOD area created by the FOD protrusion on the air bearing surface, and shrinking the high peak pressure area of the air bearing surface.

The slider includes the air bearing surface with FOD protrusion during FOD operation implementing this method, thereby providing maximum FOD efficiency, including means for minimizing the peak pressure during FOD, means for placing the peak pressure off of the FOD area created by the FOD protrusion on the air bearing surface, and means for shrinking the high peak pressure area of the air bearing surface.

This set of operational mechanisms was tested through the use of an air flow simulator under conditions comparable to a 3.5 inch hard disk drive operating at 7200 revolutions per minute, with an air speed near the inside diameter ID of 15 meters/sec or about 35 miles per hour and air speed near the outside diameter OD of 33 meters/sec or about 74 miles per hour. The optimal mechanism possesses all of these limitations.

The slider includes the means for controlling airflow over the air bearing surface during the FOD operation of the slider of the rotating disk surface to maximize the FOD efficiency. The slider may further include means for providing the air bearing surface with the FOD protrusion subject to the air flow to create an FOD airflow with a maximum of the FOD efficiency.

Certain embodiments of the slider, preferably include means for minimizing an air bearing pressure under the FOD operation away from a maximum air bearing pressure, means for placing a peak pressure off of an FOD area create by the FOD protrusion, and means for shrinking a high peak pressure area of the air bearing surface.

The air bearing surface may include at least one pad with diamond-like carbon, preferably for use in a Contact Start-Stop hard disk drive. The slider may include a read head using a spin valve or a tunneling valve. The read signals of the read head may be presented to an amplifier included in the slider to create an amplified read signal providing by the slider. The slider may include a Vertical micro-actuator for providing the FOD protrusion by employing a thermal-mechanical effect, a piezoelectric effect and/or an electrostatic effect.

This application also includes a method of manufacturing the slider by manufacturing the air bearing surface with the means for controlling airflow over the air bearing surface during the FOD operation of the slider over the rotating disk surface to maximize the FOD efficiency to create the slider. Alternatively, the method of manufacturing the slider may include manufacturing the air bearing surface with the means for minimizing, the means for placing, and the means for shrinking, to create the slider. The slider is a product of either of these processes or their equivalents.

The head gimbal assembly may preferably include the slider coupling through a flexure finger to a load beam. The head gimbal assembly may further include a micro-actuator assembly coupled with the slider to alter the lateral position of the slider over a rotating disk surface. The micro-actuator assembly may further operate under stimulus to alter the vertical position of the slider. The head gimbal assembly may further include a pitch actuator coupled to the flexure finger to attach the flexure finger to the load beam to alter the pitch angle of the slider to the rotating disk surface.

The method of manufacturing the head gimbal assembly includes coupling the slider through the flexure finger to the load beam to create the head gimbal assembly. The head gimbal assembly is a product of this manufacturing process.

The head stack assembly may preferably include a head stack coupling to at least one of these head gimbal assemblies. In certain embodiments, the head stack assembly may include the head stack coupling to at least two of these head gimbal assemblies.

Manufacturing the head stack assembly couples the head stack to the at least one head gimbal assembly to create the head stack assembly. The head stack assembly is a product of this process. The coupling of the head stack to the head gimbal assembly is typically and preferably performed by swaging the load beam of each head gimbal assembly to an actuator arm of the head stack. Each actuator arm of the head stack is typically coupled to one or two of the head gimbal assemblies.

The hard disk drive includes the head stack assembly pivotably mounted through its actuator pivot to a disk base including at least one disk rotating coupled to a spindle motor also mounted to the disk base. The hard disk drive may employ a Contact Start-Stop (CSS) parking mechanism for the slider on the disk surface or employ a ramp parking mechanism for the slider off the disk surface. Detailed simulations were performed by the inventor using air bearing surfaces for sliders of a CSS hard disk drive, and a discussion of similar air bearing surfaces for ramp parking hard disk drives will show that similar results can reasonably be expected by one skilled in the art.

Manufacturing the hard disk drive includes pivotably mounting the head stack assembly through the actuator pivot to the disk base configured with the at least one disk rotatably coupled to the spindle motor providing the rotating disk surface near the slider to create the hard disk drive. The hard disk drive is a product of this process.

Figure 4A:
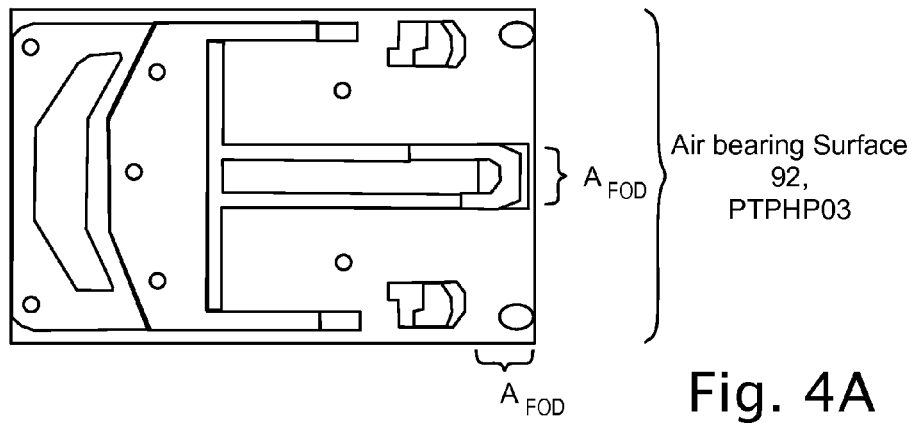
Figure 4B:
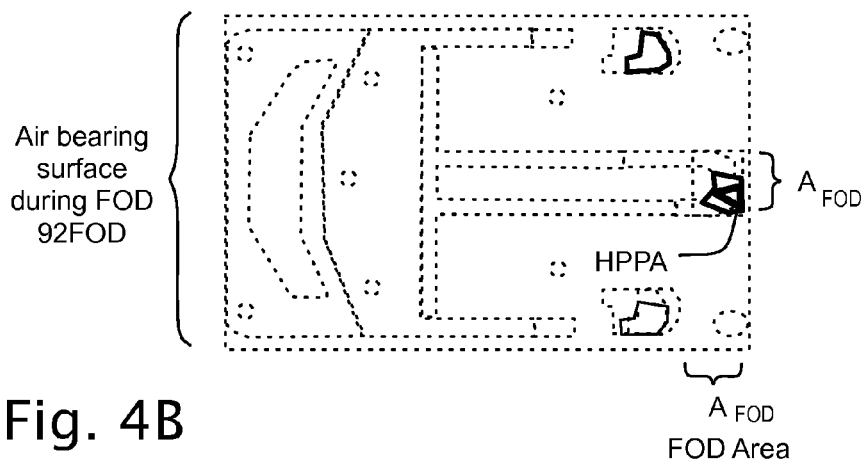
Figure 4C:
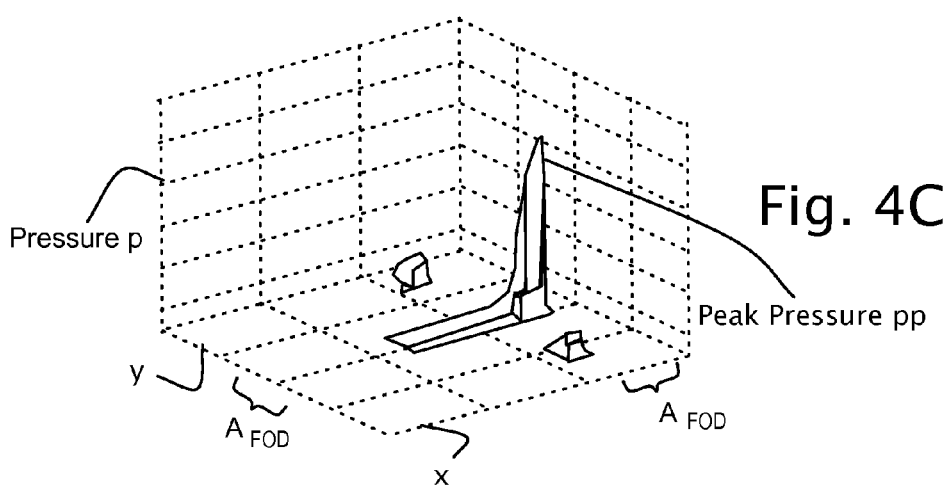
Figure 5A:
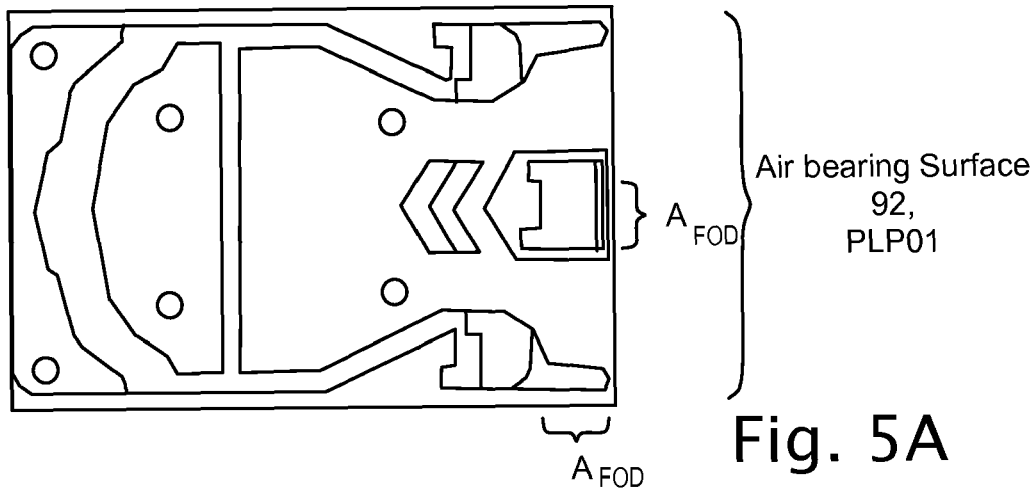
Figure 5B:
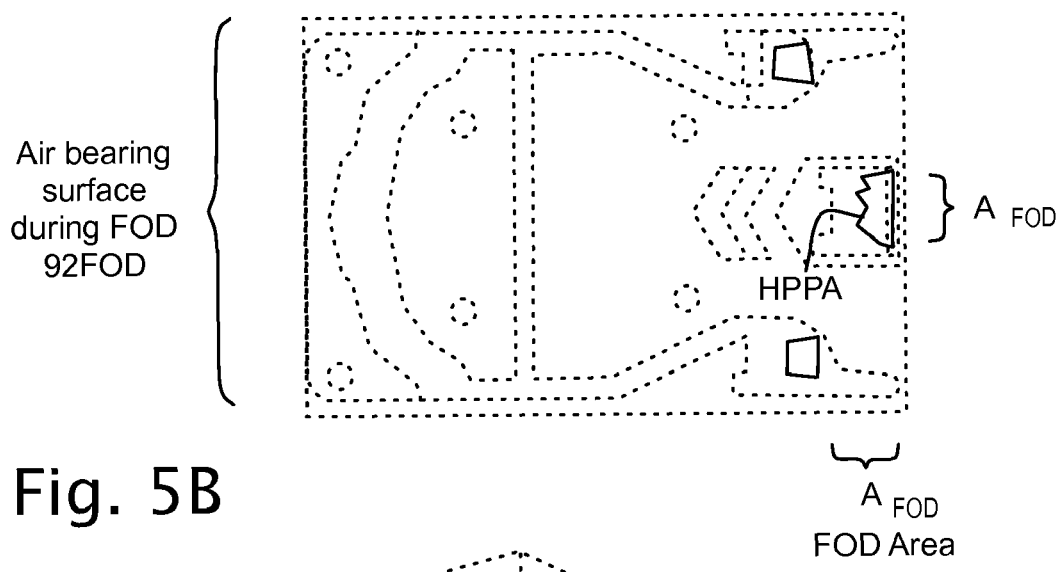
Figure 5C:
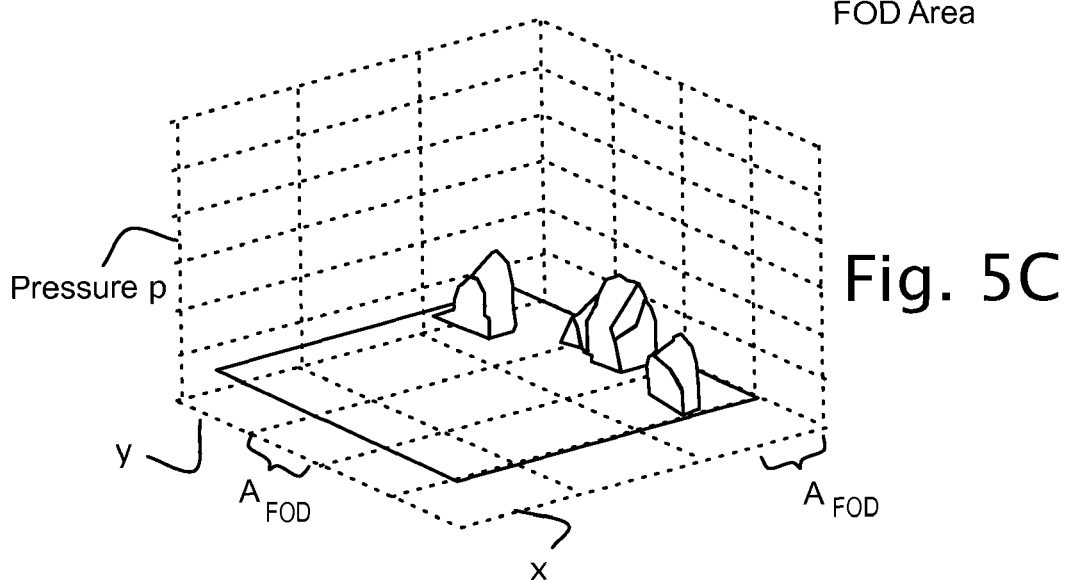
Figure 6A:
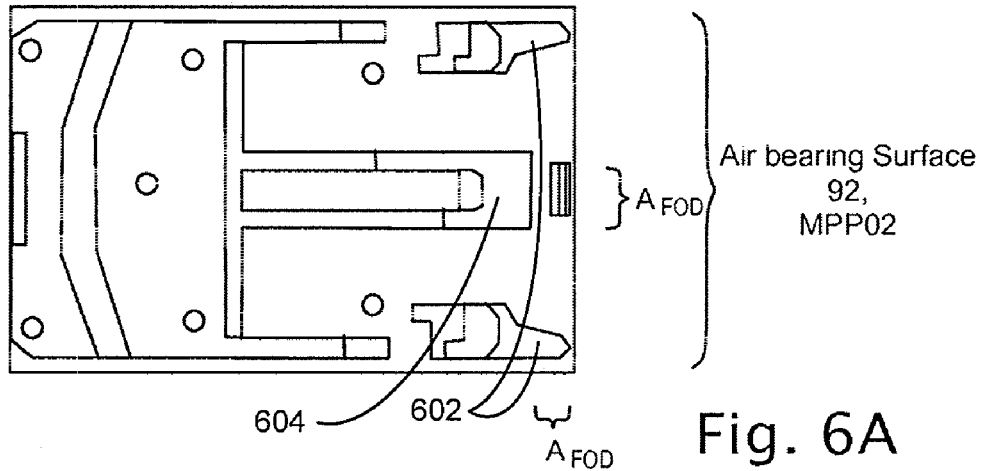
Figure 6B:
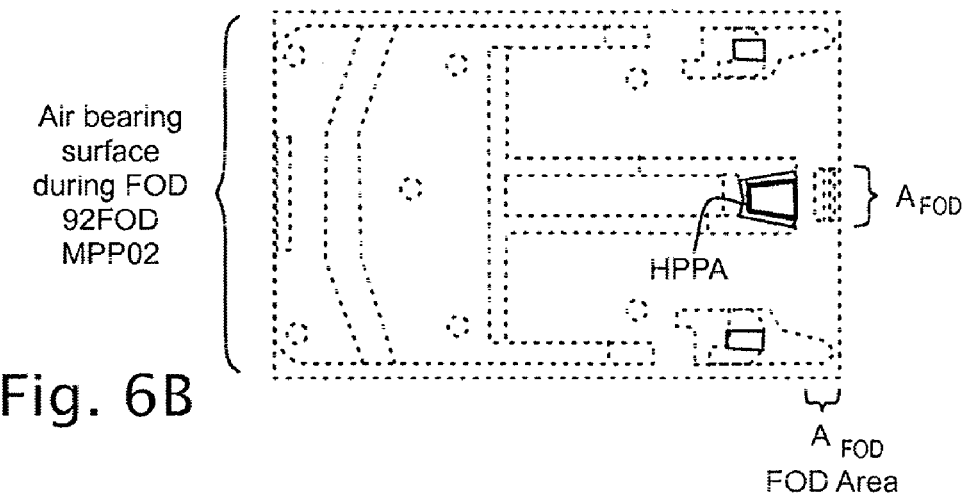
Figure 6C:
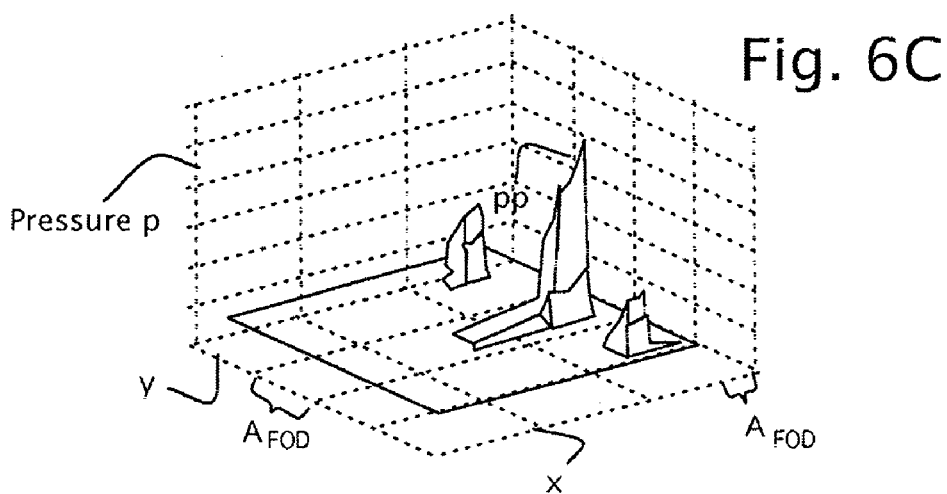
Figure 6D:
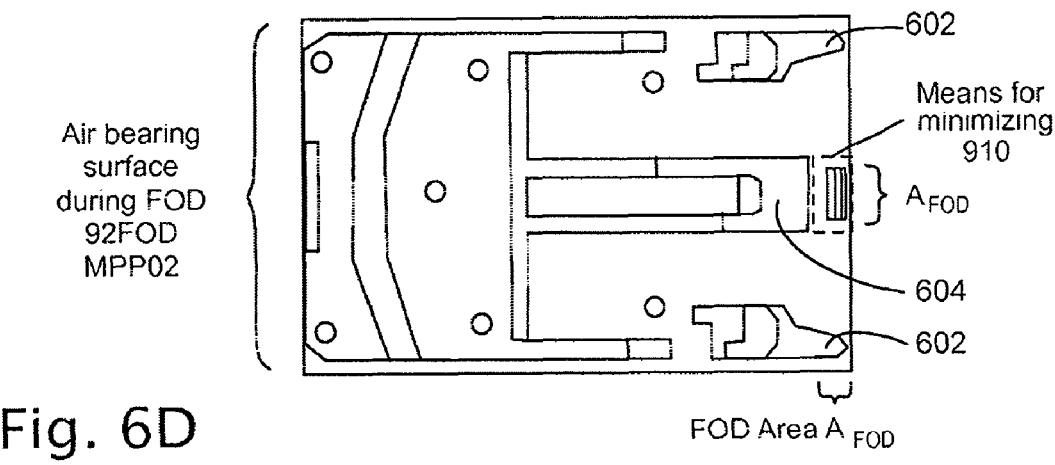
Figure 6E:
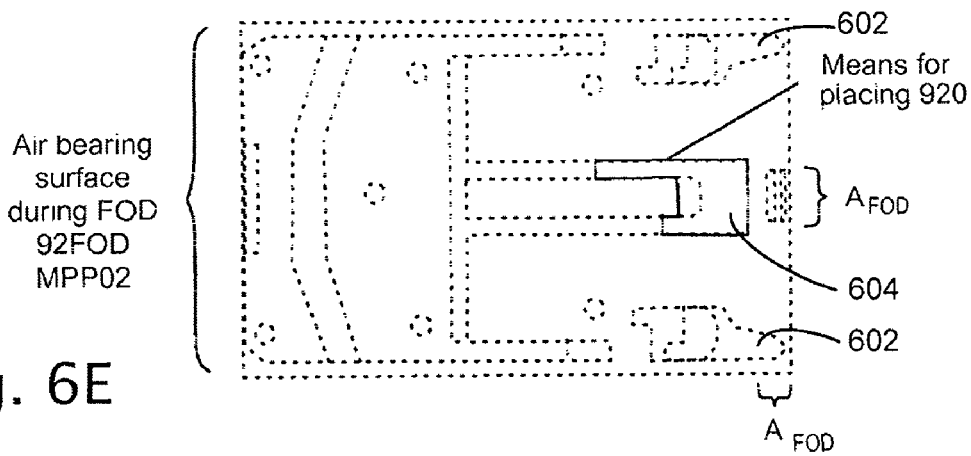
Figure 6F:
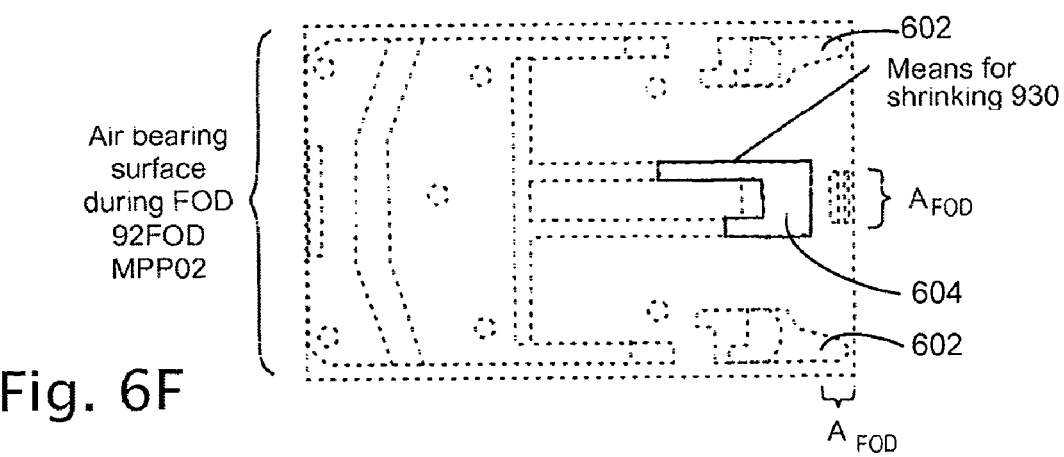
Figure 7A:
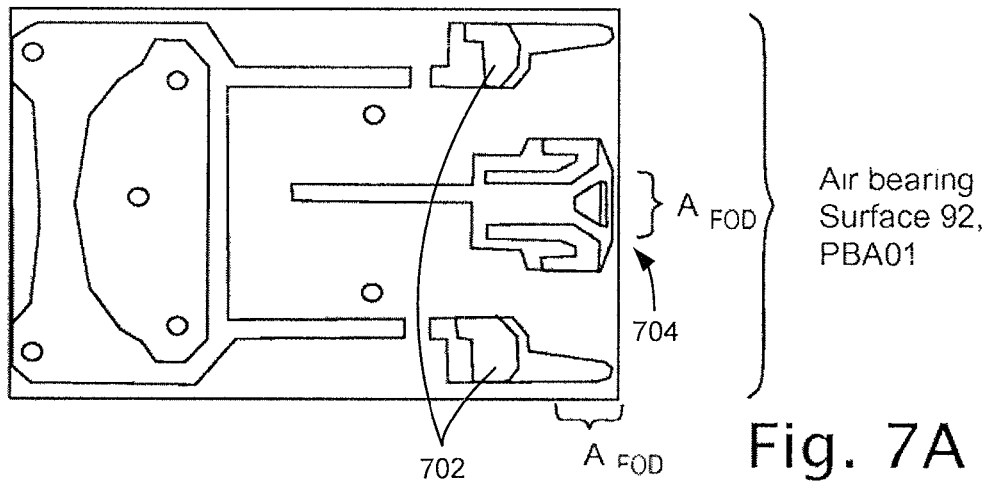
Figure 7B:
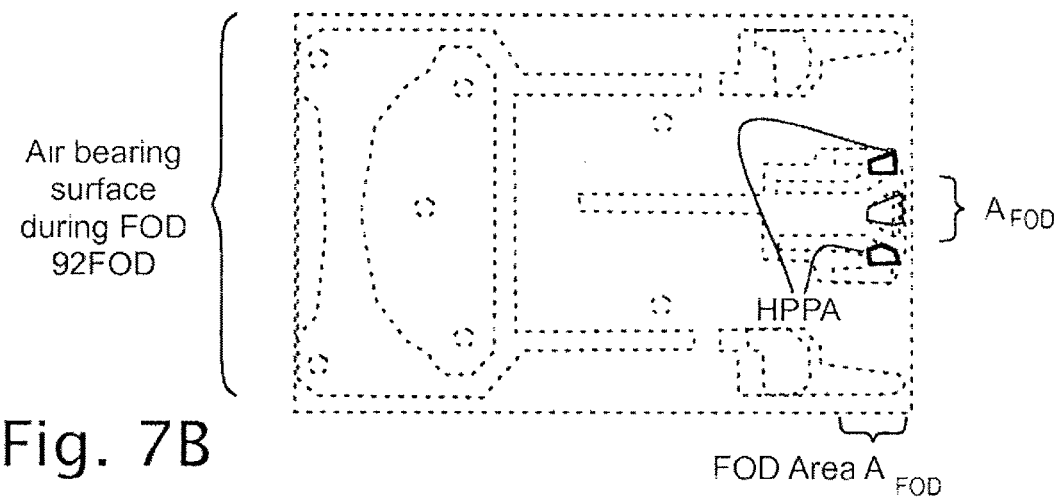
Figure 7C:
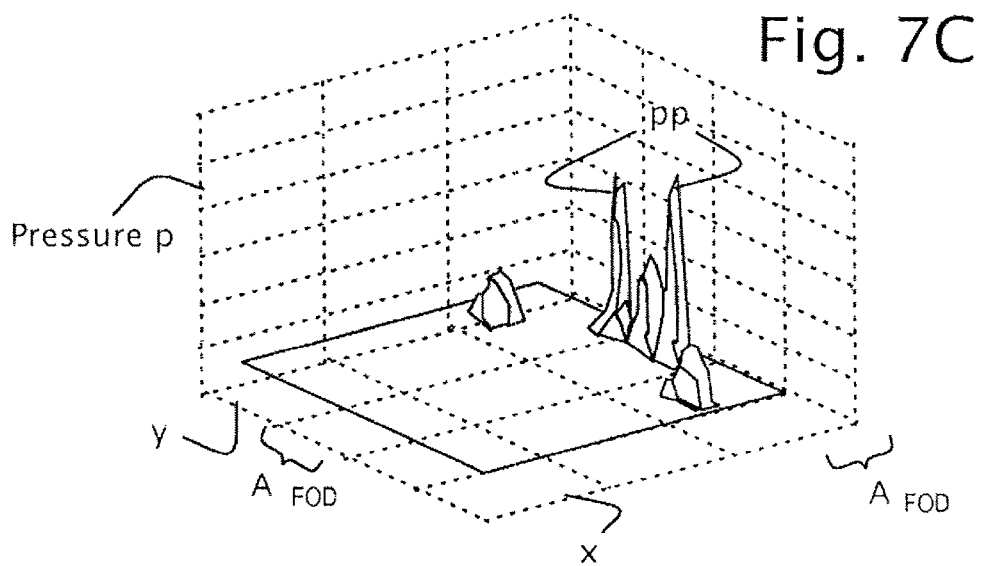
Figure 8A:
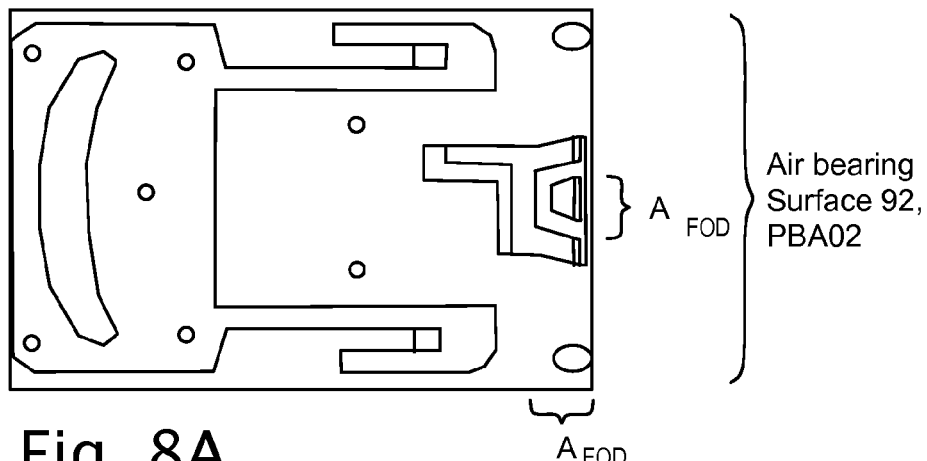
Figure 8B:
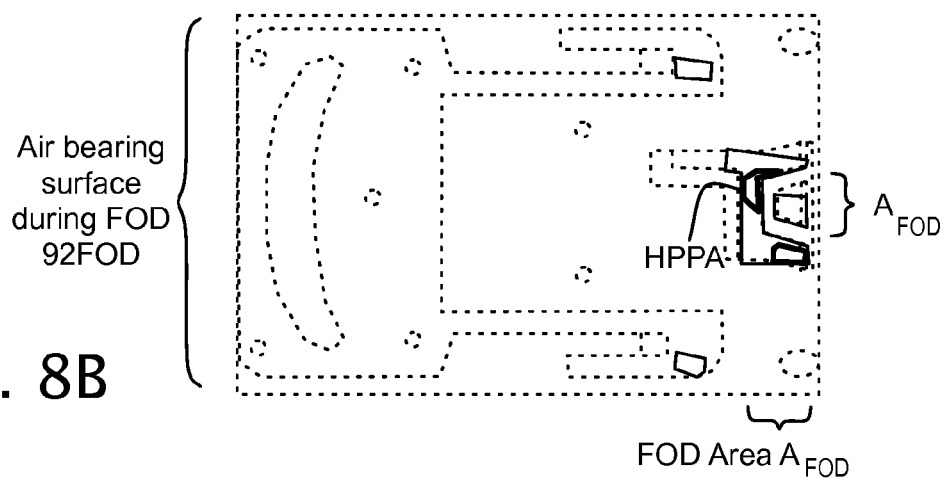
Figure 8C:
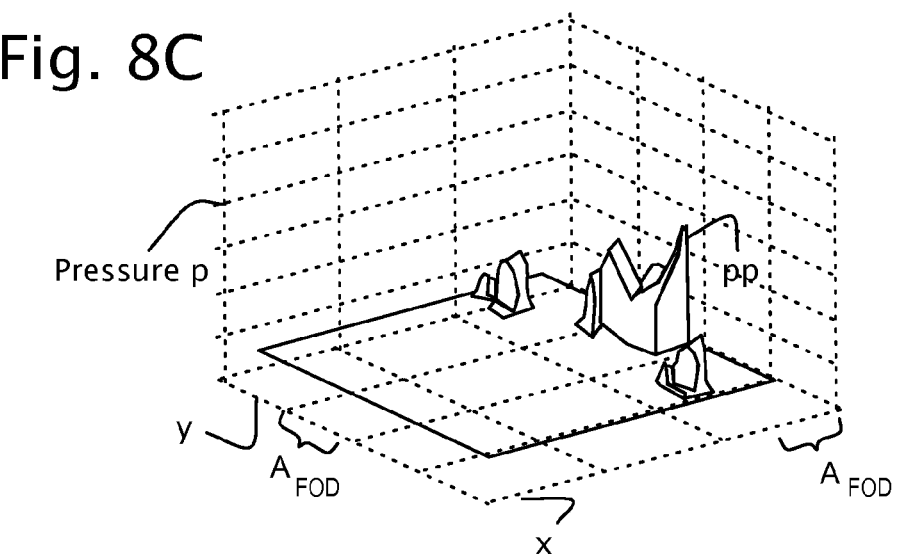
Figure 9A:
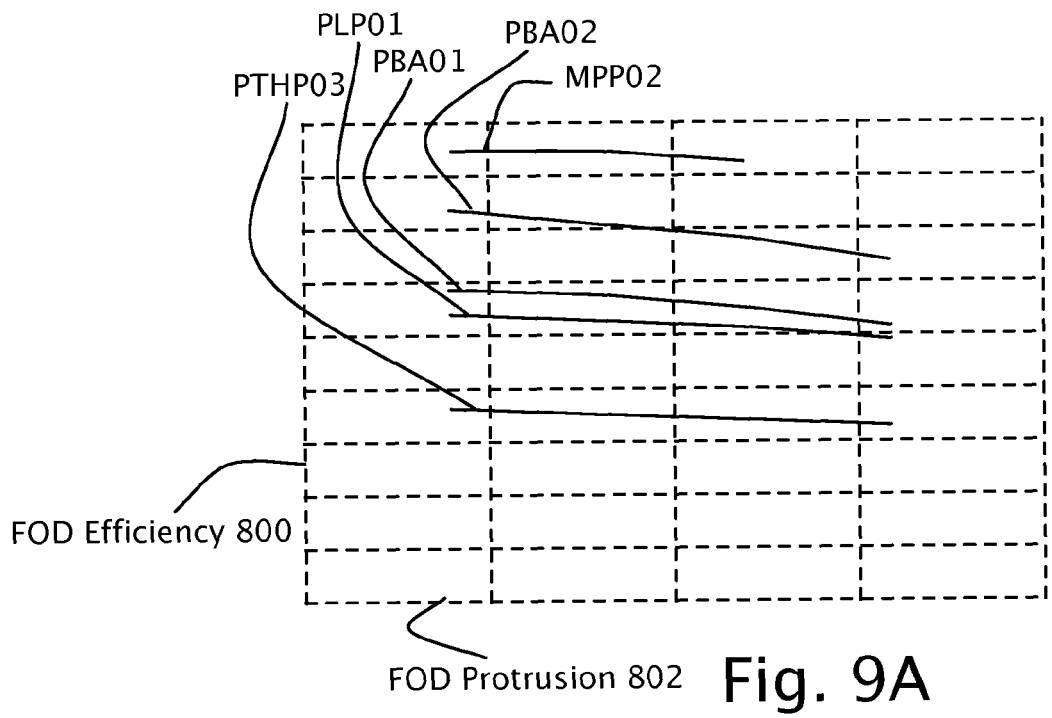
Figure 9B:
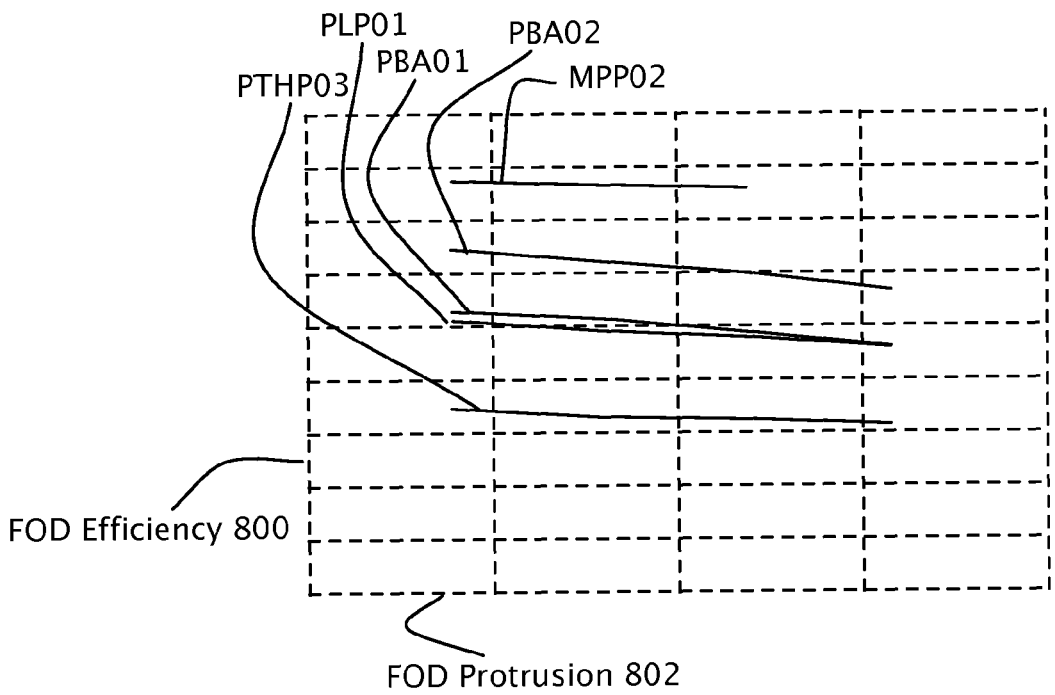
Figure 10A:
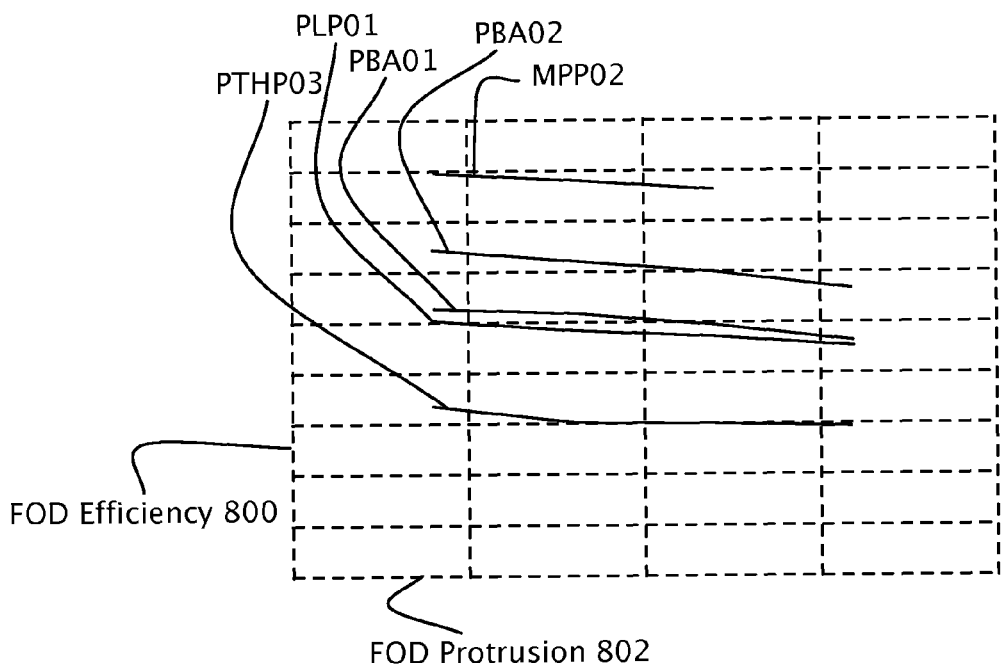
Figure 10B:
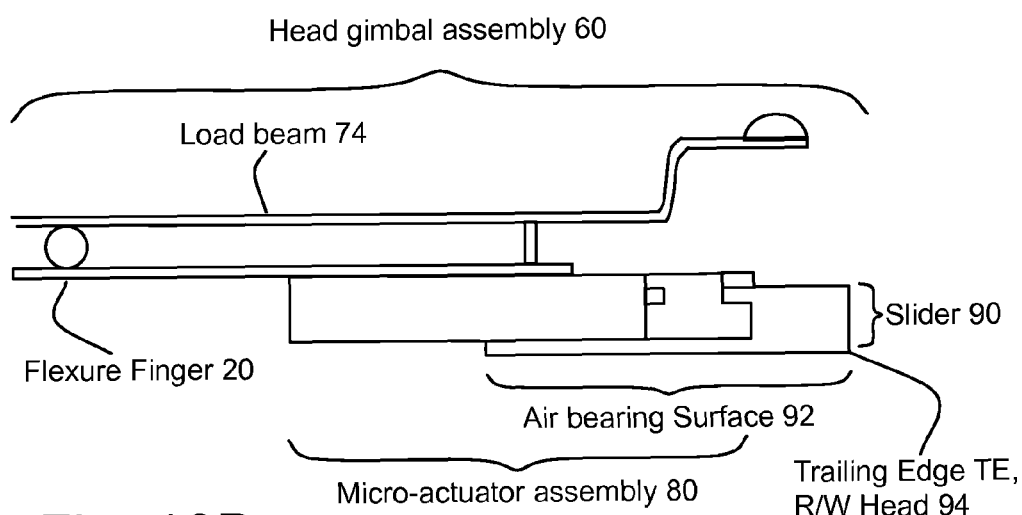
Figure 11A:
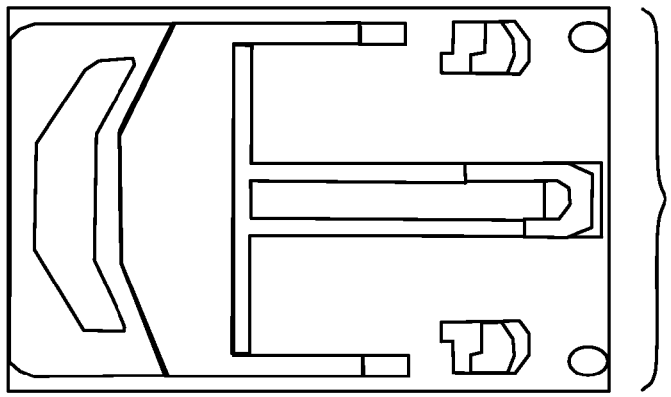
Figure 11B:
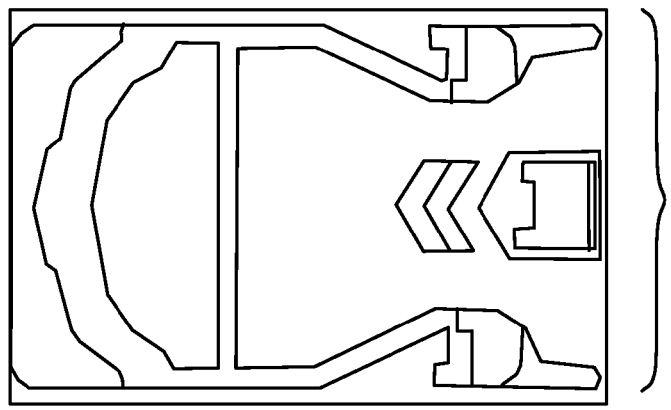
Figure 11C:
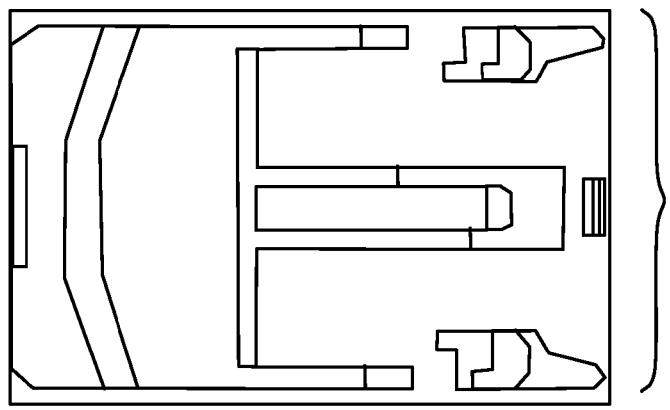
Figure 11D:
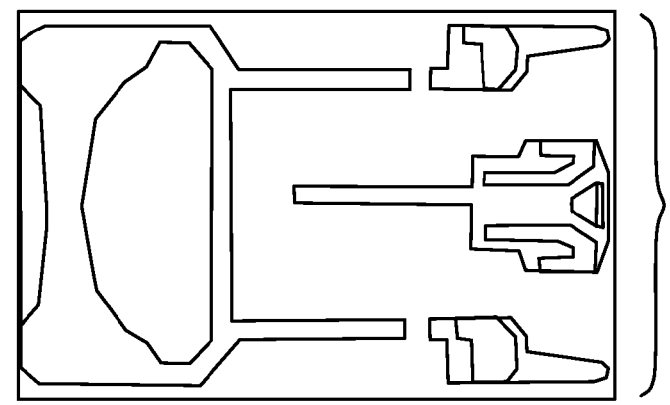
Figure 12A:
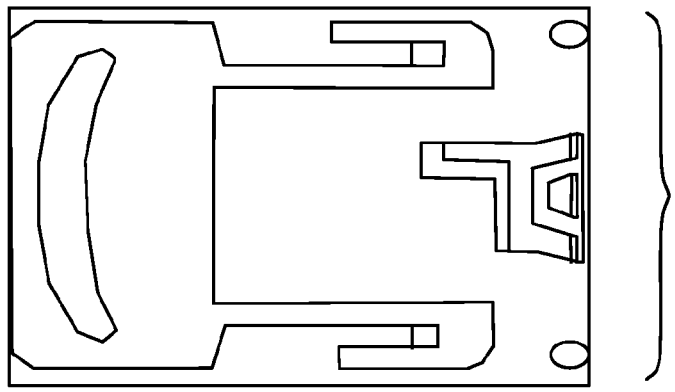
Figure 12B:
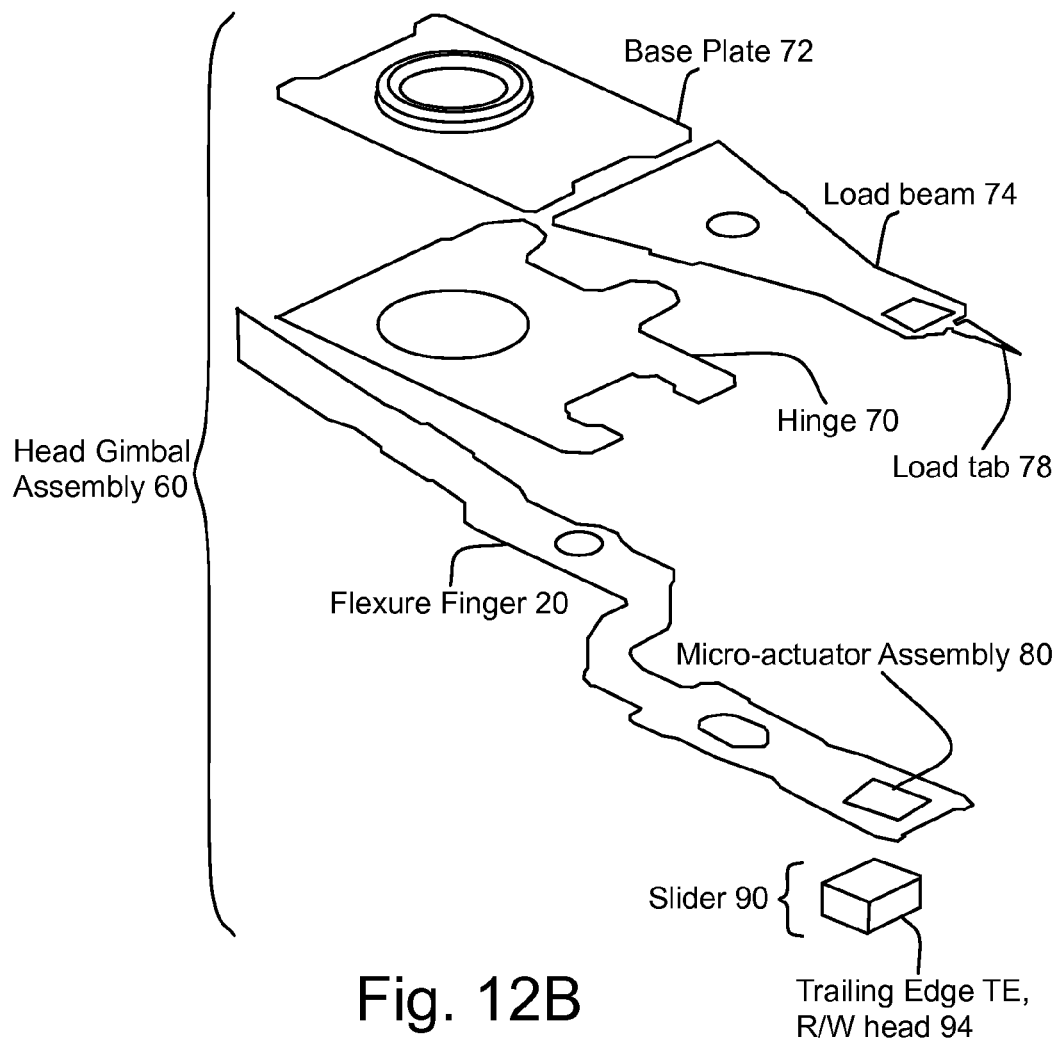
Figure 13A:
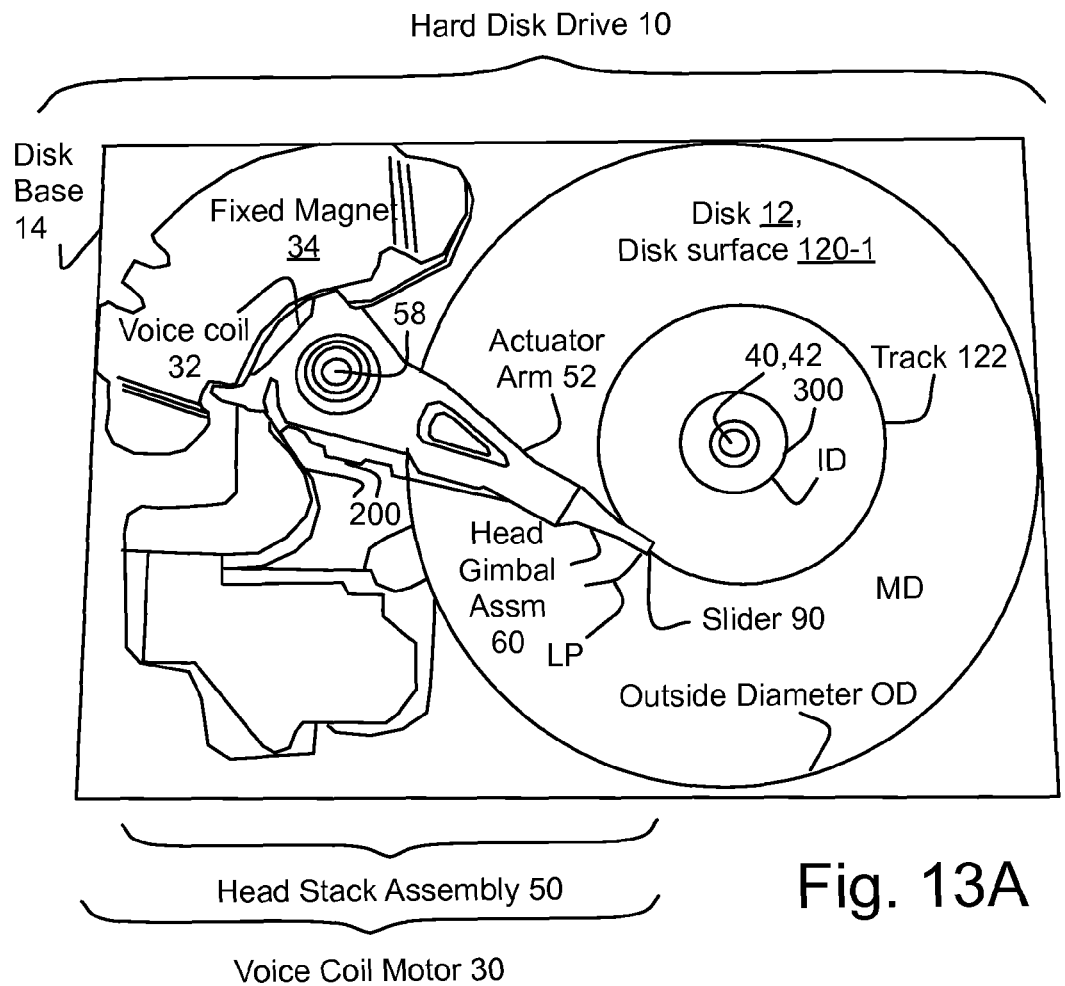
Figure 13B:
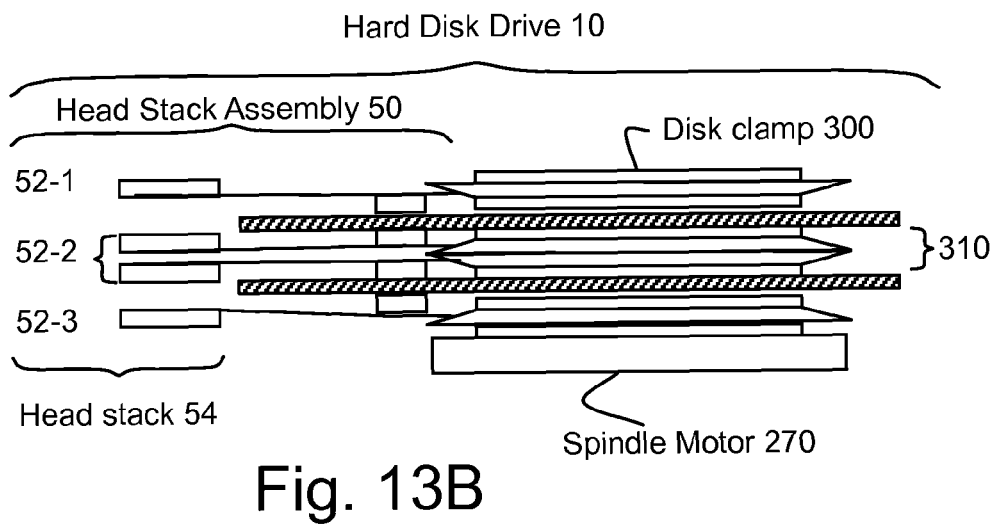
Figure 14A:
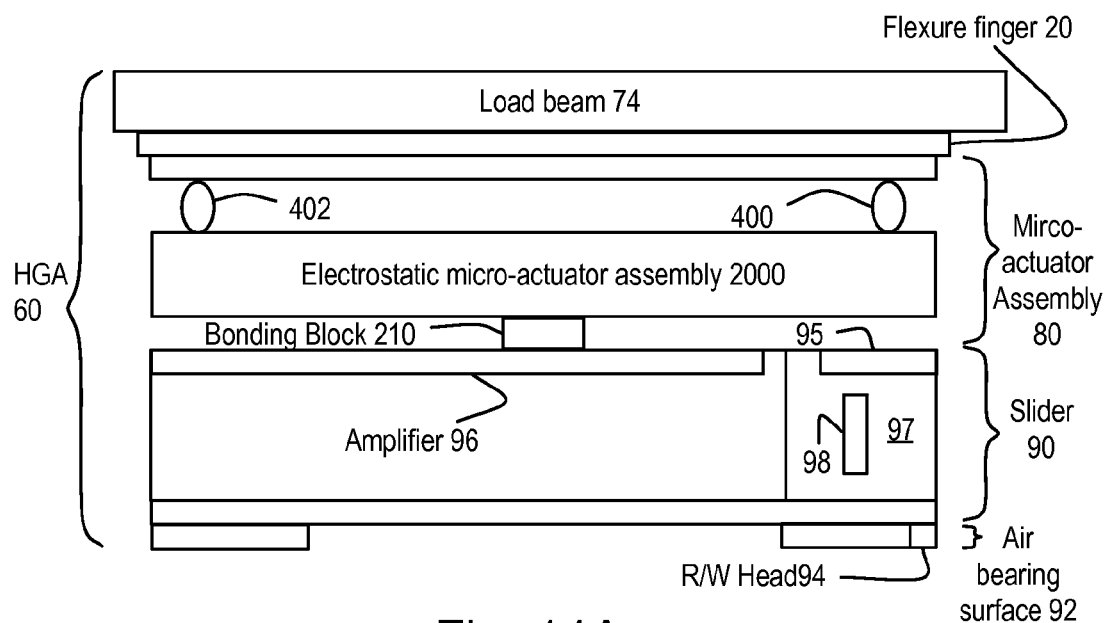
Figure 14B:
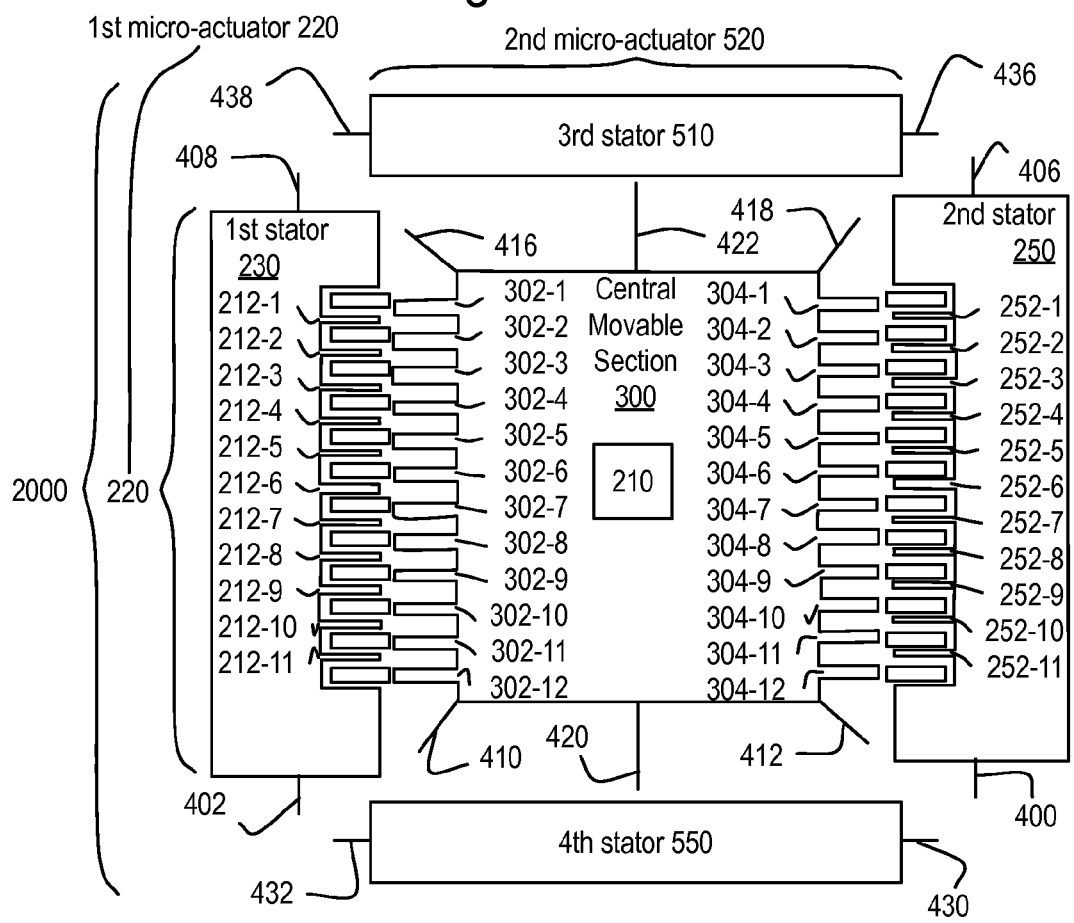
Figure 15:
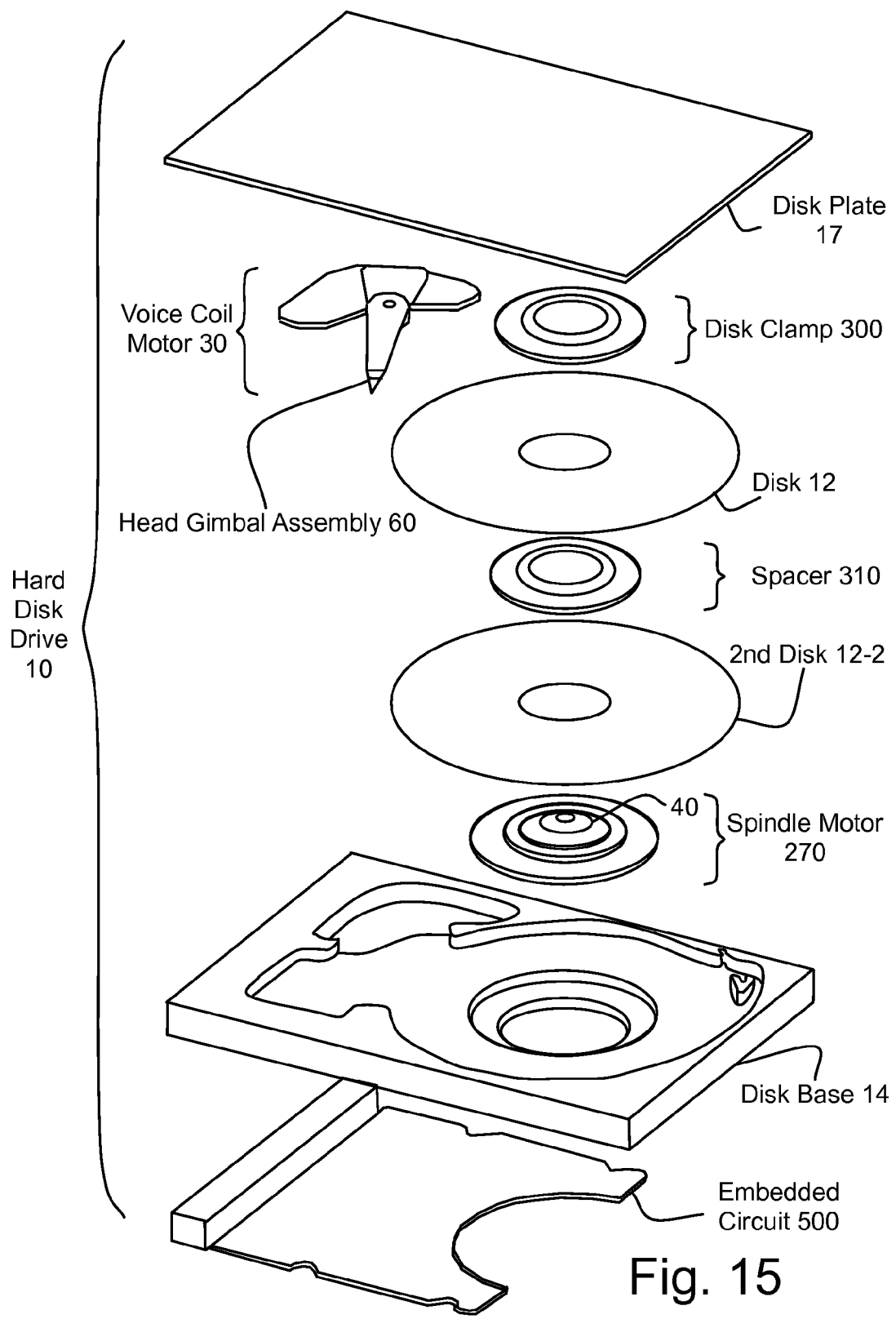

3G show the general terms and elements of examples of a slider and air bearing surface in accord with the invention;

FIGS. 4A to 4C show an example air bearing surface designated as PTPH03 implementing a high pressure design;

FIGS. 5A to 5C show an example air bearing surface designated PLP01 implementing a low pressure design;

FIGS. 6A to 6C show an example of a preferred air bearing surface designated MPP02, implementing a high peak pressure plus low FOD pressure and area design;

FIGS. 6D shows the air bearing surface MPP02 of FIGS. 6A to 6C including an example of the means for minimizing air bearing pressure under the FOD operation away from a maximum air bearing pressure;

FIG. 6E shows the air bearing surface MPP02 of FIGS. 6A to 6D including an example of the means for placing a peak pressure off of an FOD area create by the FOD protrusion;

FIG. 6F shows the air bearing surface MPP02 of FIGS. 6A to 6E including an example of the means for shrinking a high peak pressure area of the air bearing surface;

FIGS. 7A to 7C show an example air bearing surface designated PBA01, implementing a high peak pressure off of the FOD area;

FIGS. 8A to 8C show an example air bearing surface designated PBA02, implementing peak pressure off of the FOD area;

FIG. 9A shows the test results for these embodiments for a slider located near the inside diameter of the rotating disk surface;

FIG. 9B shows the test results for these embodiments for a slider located near the middle diameter of the rotating disk surface;

FIG. 10A shows the test results for these embodiments for a slider located near the outside diameter of the rotating disk surface;

FIG. 10B shows a side view of a head gimbal assembly in accord with the invention;

FIGS. 11A to 12A show versions of the air bearing surfaces of FIGS. 4A to 8C useful in a hard disk drive employing a ramp mechanism to park sliders off disk surfaces;

FIG. 12B shows some details of the head gimbal assembly of FIG. 10B;

FIGS. 13A and 13B show some details of various embodiments of the invention's hard disk drive;

FIGS. 14A and 14B show some details of a micro-actuator assembly for the head gimbal assembly of the previous Figures, which employs an electrostatic effect; and FIG. 15 shows some further details of the hard disk drive of the previous Figures.

DETAILED DESCRIPTION

This application relates to an air bearing surface 92 of a slider 90 accessing a rotating disk surface 120 in a hard disk drive 10, in particular to controlling air flow 91 over the air bearing surface during a Flying height On Demand (FOD) operation using an FOD protrusion 97FOD on the air bearing surface.

Figure 1A:
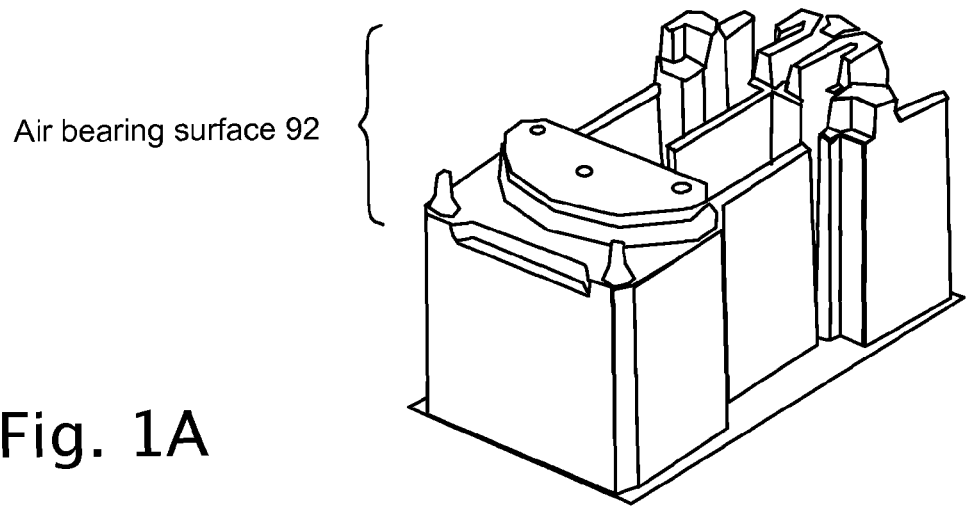
FIGS. 1A to 1C show examples of the control of air flow over the air bearing surface of a slider during flying height on demand operations of the slider over a rotating disk surface in a hard disk drive.
Figure 1B:
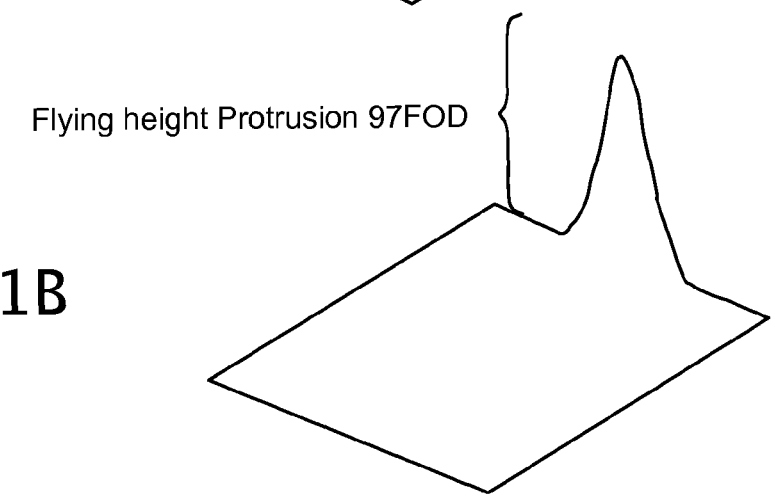
Figure 1C:
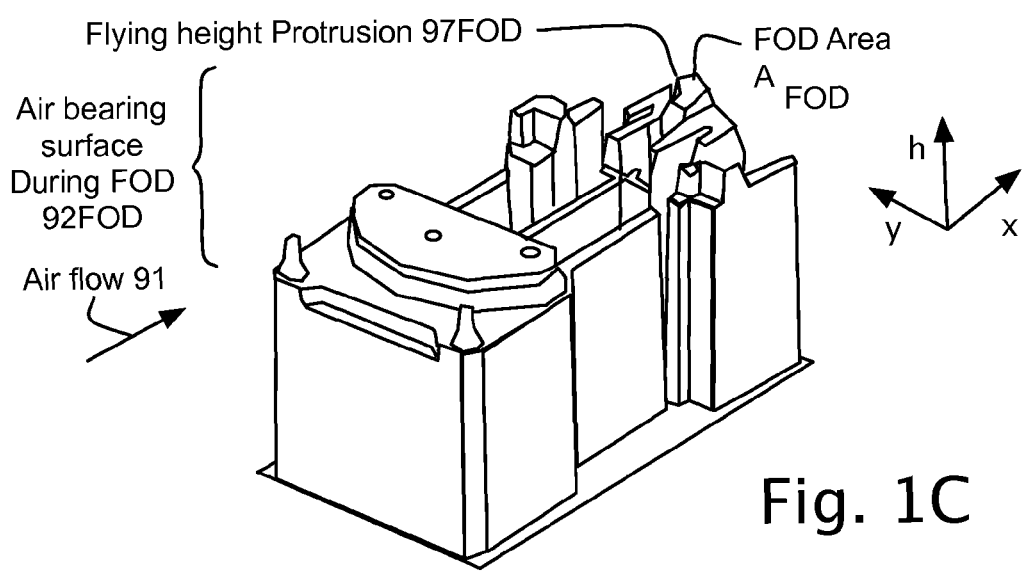
Figure 2A:
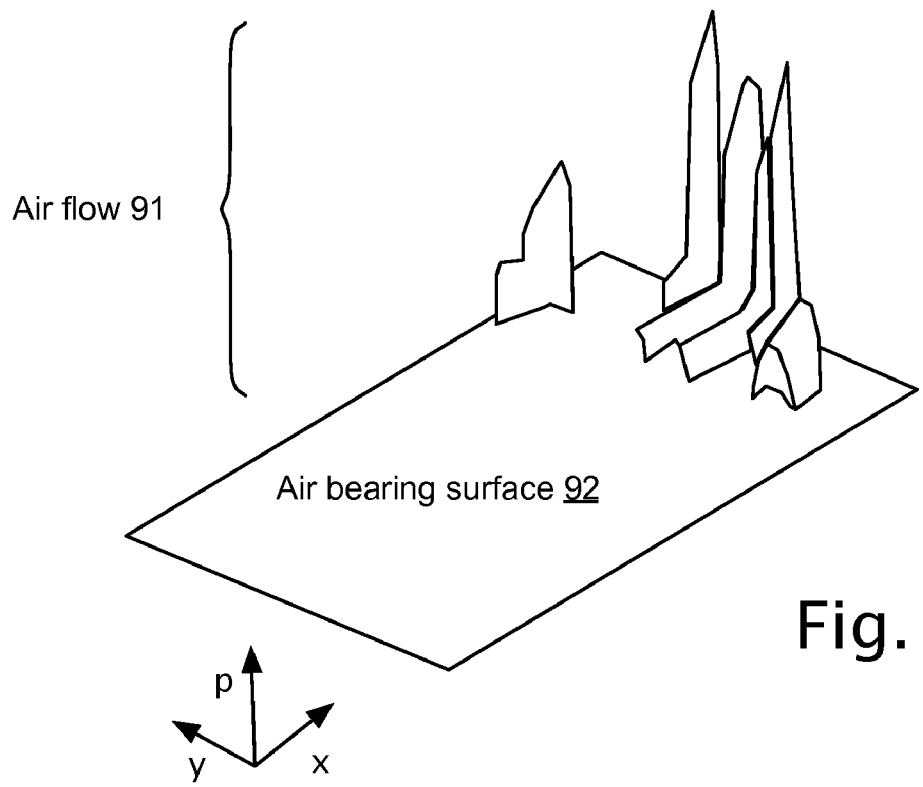
FIGS. 2A and 2B show the change of the air bearing pressure map before and during a flying height on demand operation for the air bearing surface and its slider of FIGS. 1C to 1C.
Figure 2B:
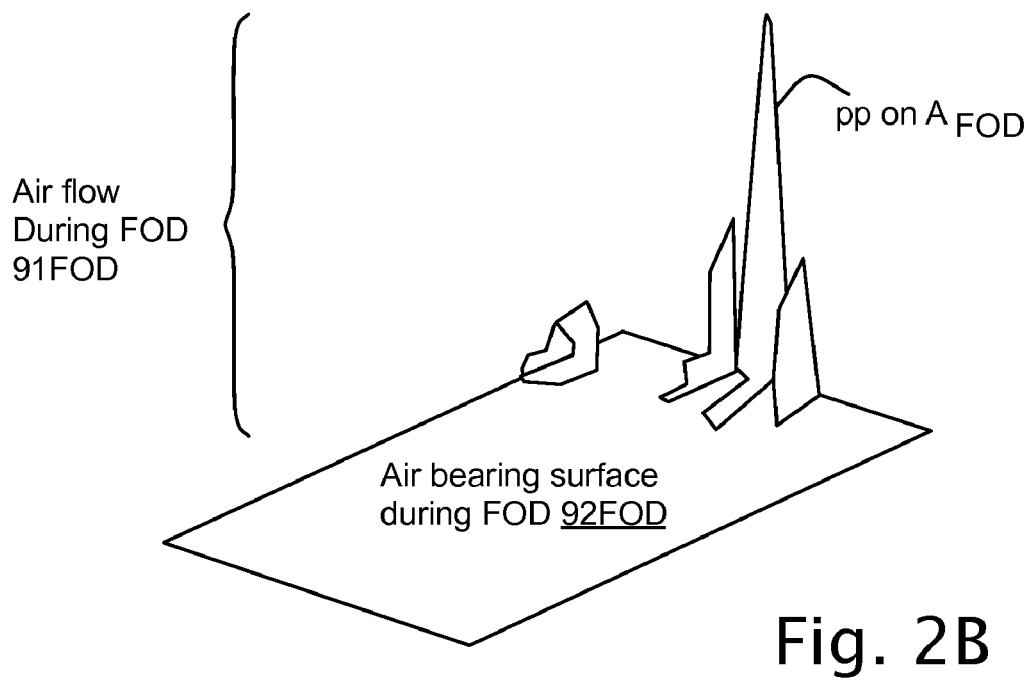
Figure 3A:
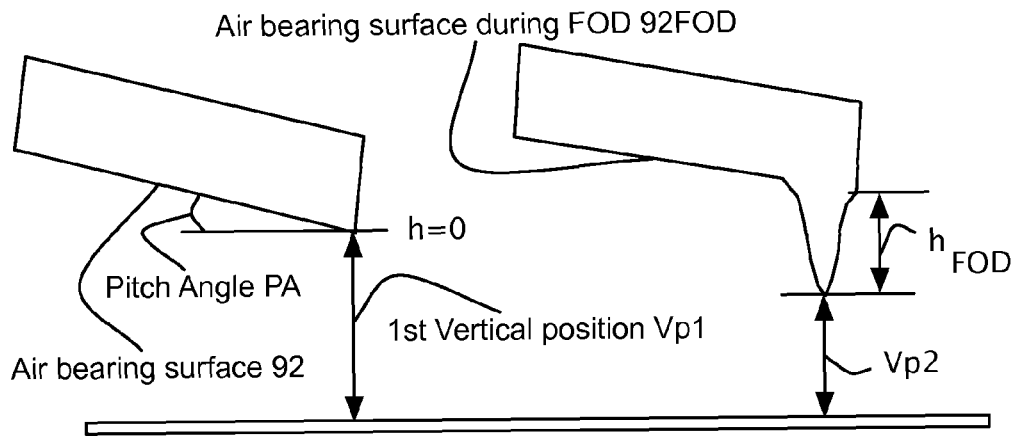
FIGS. 3A and 3B show the change in the slider flying height or vertical position before and during a flying height on demand operation for the air bearing surface and its slider of FIGS. 1C to 1C.
Figure 3B:
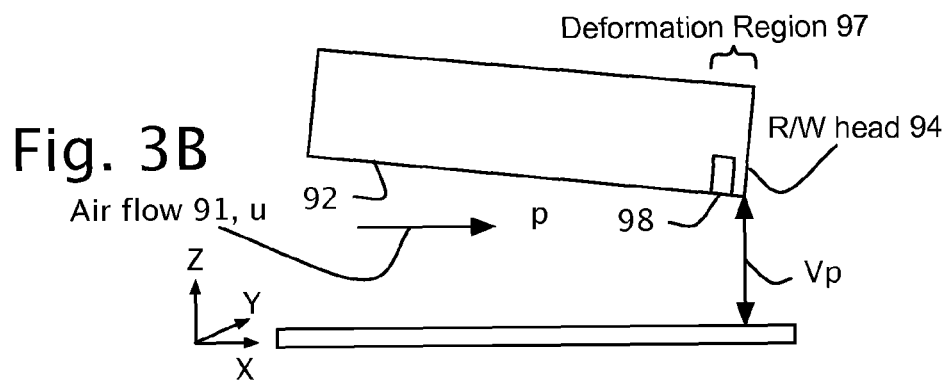

The aspects of the invention include a method of controlling air flow 91 over the air bearing surface 92 of a slider 90 during a Flying height On Demand (FOD) operation of the slider over a rotating disk surface 120 in a hard disk drive 10 as shown in FIGS. 1A to 2B. As used herein the FOD operation includes the formation of an FOD protrusion 97FOD on the slider, which deforms the air bearing surface. This deformation of the air bearing surface changes the air bearing pressure map as shown in FIGS. 2A and 2B, and the slider flying height, or vertical position Vp over the rotating disk surface as shown in FIGS. 3A and 3B. The FOD efficiency $E_{FOD}$ was calculated as the vertical position change $\Delta Vp$ divided by the FOD protrusion height HFOD, or $$E_{FOD} = \frac{\Delta Vp}{h_{FOD}} = \frac{Vp_2 - Vp_1}{h_{FOD}} \quad (1.1)$$

As used herein, FOD operations occur when a vertical micro-actuator 98 is stimulated, which alters a deformation region 97 by applying a stress and/or a strain, to alter the vertical position Vp of the read-write head 94 of the slider 90. Typically, the stimulus to the vertical micro-actuator is electrical. The vertical micro-actuator may employ a thermo-mechanical effect, a piezoelectric effect, and/or an electrostatic effect. Today, the thermo-mechanical effect is preferred, though the scope of the claims includes vertical micro-actuators employing any combination of these three effects.

Figure 3C:
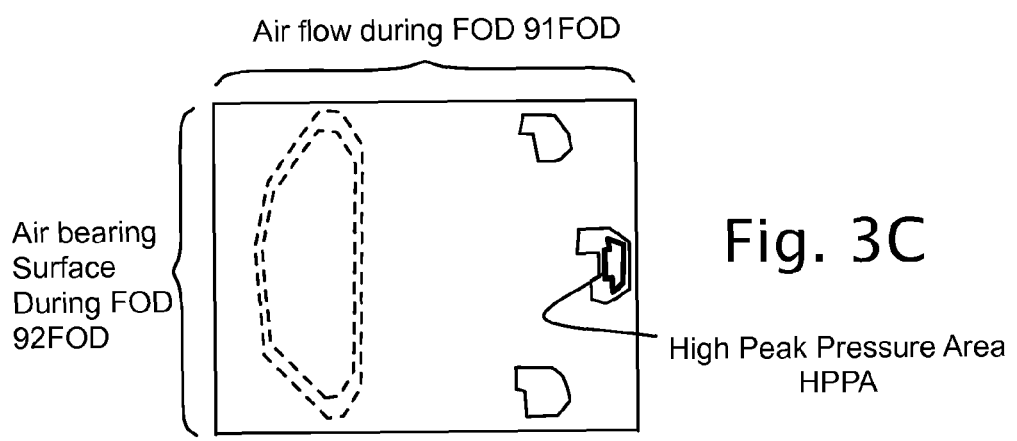
FIG. 3C shows an example of a method providing an air bearing surface with an FOD protrusion subject to an airflow near a rotating disk surface to create an FOD airflow over the air bearing surface with maximized FOD efficiency.

The method includes providing an air bearing surface 92 with an MD protrusion 97FOD subject to airflow 91 near a rotating disk surface 120 to create FOD airflow 91FOD over the air bearing surface with maximum FOD efficiency EFOD as shown in FIG. 3C. The FOD protrusion 97FOD can have a polygon shape. Providing 902 the air bearing surface 92 further includes minimizing the air bearing pressure p under the FOD protrusion 97FOD, placing a peak pressure pp off of the FOD area created by the FOD protrusion on the air bearing surface, and shrinking the high peak pressure area HPPA of the air bearing surface.

Figure 3D:
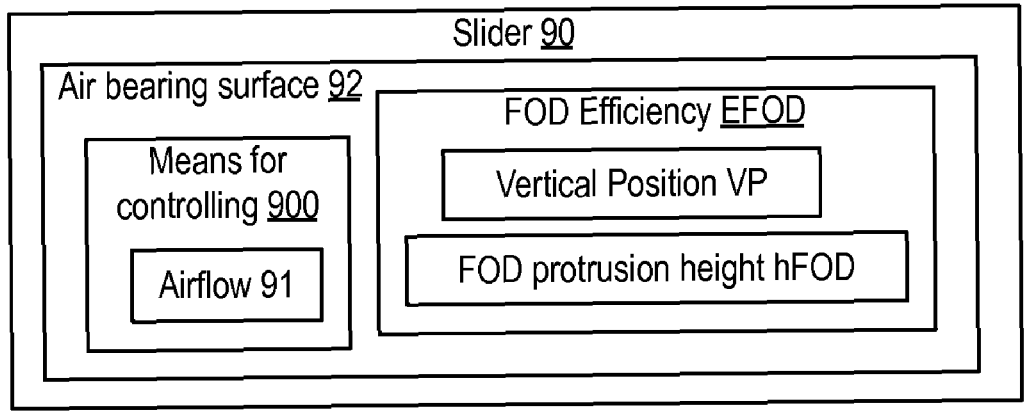
FIGS. 3D to 3F show in schematic fashion a slider may include the means for controlling airflow over the air bearing surface during the FOD operation of the slider of the rotating disk surface to maximize the FOD efficiency.
Figure 3E:
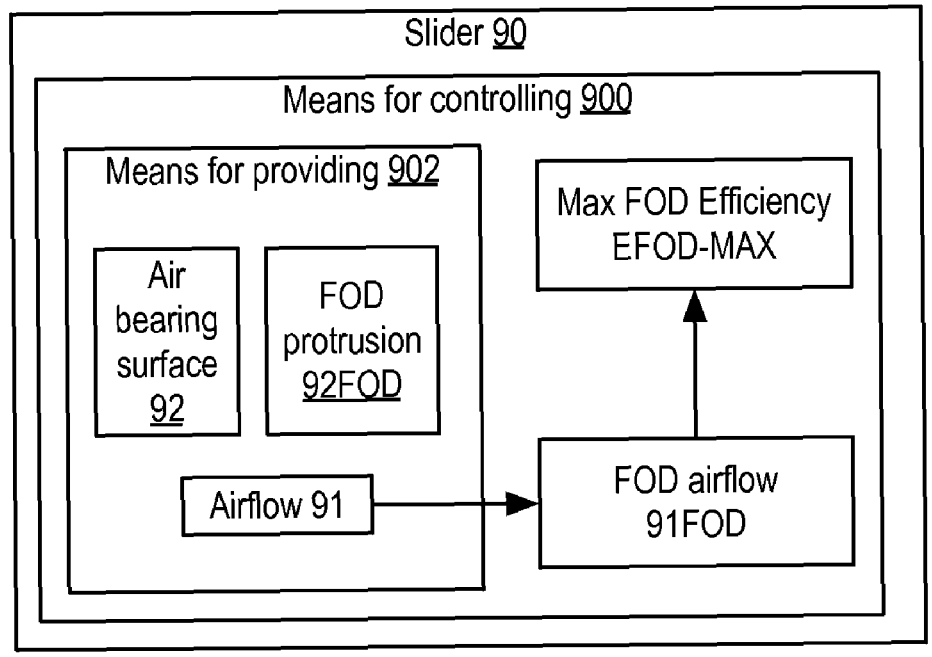
Figure 3F:
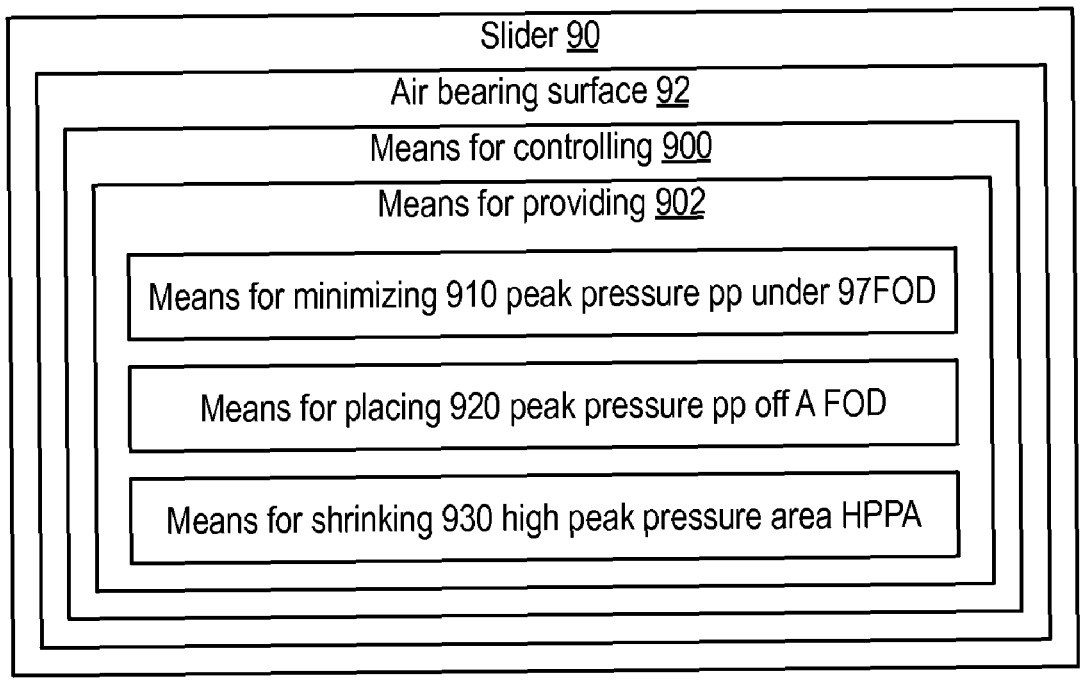

The slider 90 may include the means for controlling 900 airflow 91 over the air bearing surface 92 during the FOD operation of the slider of the rotating disk surface 120 to maximize the FOD efficiency EFOD as shown in FIGS. 3D to 3F. The slider may further include means for providing 902 the air bearing surface 92 with the FOD protrusion 97FOD subject to the air flow 91 to create FOD airflow 91FOD with a maximum FOD efficiency EFOD-MAX.

The slider 90 may include the air bearing surface 92 with FOD protrusion 97FOD during FOD operation implementing this method, thereby providing maximum FOD efficiency EFOD, preferably including the means for minimizing 910 the peak pressure Pp during FOD, the means for placing 920 the peak pressure Pp off of the FOD area AFOD created by the FOD protrusion on the air bearing surface, and the means for shrinking 930 the high peak pressure area HPPA of the air bearing surface.

Figure 3G:
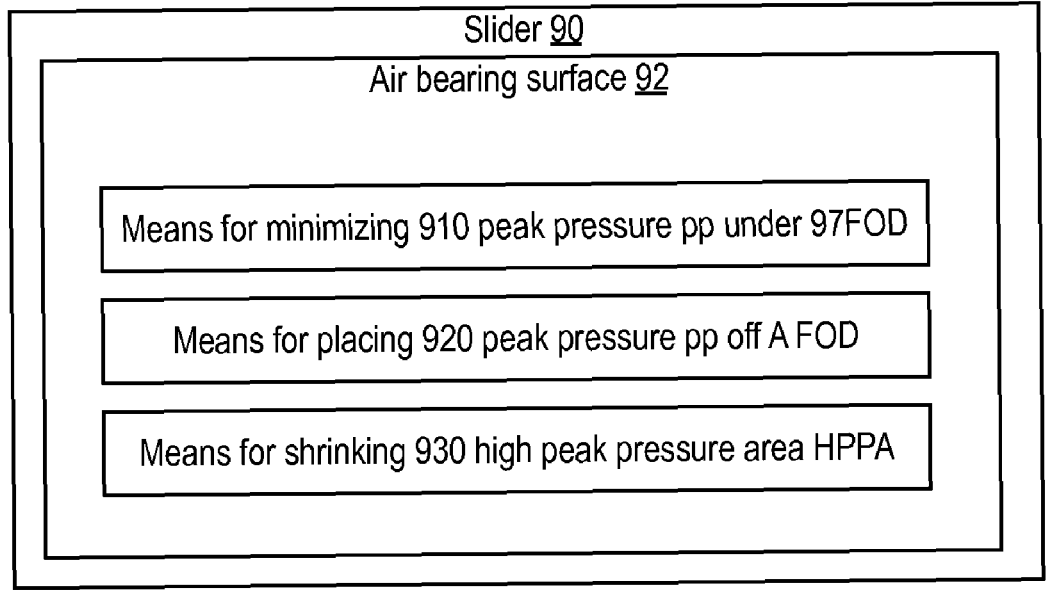

Certain embodiments of the slider preferably include means for minimizing 910 the peak pressure Pp during FOD, the means for placing 920 the peak pressure Pp off of the FOD area AFOD created by the FOD protrusion on the air bearing surface, and the means for shrinking 930 the high peak pressure area HPPA of the air bearing surface as shown in FIG. 3G. Note that these embodiments may not specifically include the means for controlling 900 and/or the means for providing 902 to maximize the FOD efficiency EFOD, as found in the FIGS. 3D to 3F.

This set of operational mechanisms was tested through the use of an air flow simulator under conditions comparable to a 3.5 inch hard disk drive 10 operating at 7200 revolutions per minute, with an air speed u near the inside diameter ID of 15 meters/sec or about 35 miles per hour and air speed near the outside diameter OD of 33 meters/sec or about 74 miles per hour. The optimal mechanism preferably possessed all of these features. All of these simulation tests were run with the test air bearing surface 92 at the same flying height, or vertical position Vp and used a slider with the same dimensions in the X and Y axis of 1.235 millimeter by 0.7 millimeters. The results can also be used to sliders with other sizes. A vertical micro-actuator 98 employing the thermo-mechanical effect was used. The air bearing surfaces tested were targeted for a Contact-Start Stop (CSS) hard disk drive 10, and each include at least one pad PDLC or Pad with Diamond-Like Carbon, as shown in the Figures.

The slider may include means for controlling 900 based upon the FOD protrusion 97FOD shape and location, which in turn may depend on vertical micro-actuator, as well as the pitch angle PA shown in FIG. 3A.

The FOD protrusion 97FOD causes a drop in the vertical position and increases the pressure FOD area AFOD. To balance the suspension forces that remain the same and changed air bearing forces due to FOD, slider 90 adjusts its flying attitude usually by increasing vertical position and decreasing its pitch angle PA, which reduces the actual FH adjustment.

Based on the lubrication theory of aerodynamics, the air bearing pressure p increases with the decrease of the air bearing spacing, its vertical position Vp. The FOD protrusion 97FOD reduces the vertical position and increases the air bearing pressure locally. The overall air bearing forces are changed also. As the air bearing forces grow, the larger the need for the slider 90 to be lifted to re-balance the forces from both suspension and air bearing.

Consider a dimensional analysis to study the air bearing force changes due to the FOD protrusion 97FOD, where L is a characteristic length such as the size of slider or the FOD effecting area. The following formula expresses the local conservation of mass in a fluid system with essentially incompressible flow:

$$\frac{\partial p}{\partial x} = \mu \frac{\partial u^2}{\partial z^2} \quad (1.2)$$

$$\frac{\partial p}{\partial y} = \mu \frac{\partial v^2}{\partial z^2}$$

If h changes due to the FOD protrusion 97FOD, the air bearing pressure p will tend to change locally as below:

$$\frac{\partial p}{\partial h} \sim -2\mu \frac{LU}{h^3} \sim -2\frac{p}{h} \quad (1.3)$$

This leads to the air bearing pressure change due to FOD $\Delta F_L$ is approximated as follows:

$$\Delta F_L \sim \int_A -2\frac{p\Delta h}{h} dA \quad (1.4)$$

The inventor discovered that there are three major factors affecting the air bearing force changes induced by FOD (assuming fixed slider's flying attitude):

Air bearing pressure p in FOD affecting area, higher p leads to larger $\Delta F_L$.

Relative FOD induced spacing change, which will be defined herein as $\Delta h/h$. Under the same FOD protrusion $\Delta h$, the smaller h the larger $\Delta F_L$ leads to stiffer response when FOD protrusion 97FOD is closer to disk surface 120.

FOD affecting area AFOD, defined mathematically herein as A and shown in the Figures as $A_{FOD}$. The smaller A, the smaller $\Delta F_L$. Viewed another way, making the FOD affecting area AFOD FAR FROM the high air bearing pressure area HOOA may also help reduce the $\Delta F_L$.

These factors are summarized as follows in Equation (1.4): Where the integral is over the FOD affecting area, A and takes into account both the air bearing pressure in the FOD affecting area p, the FOD induced spacing change $\Delta h/h$.

Since the suspension forces present in a head gimbal assembly 60 remain essentially the same, a slider 90 will adjust its flying height, or vertical position Vp to rebalance the changed air bearing forces. The larger the $\Delta F_L$ the larger lift it will need.

These considerations lead the inventor to adapt and test the following operational strategy to improve FOD efficiency:

Minimizing 910 the peak pressure pp under FOD protrusion 97FOD,

Placing 920 the peak pressure pp off of the FOD area AFOD, and

Shrinking 930 the high peak pressure area HPPA.

The following table summarizes each air bearing surface 92 tested using a computer simulation:

| air bearing surface test designator, FIGURES | Remarks | Peak Pressure (ID) | Peak Pressure (OD) | FOD efficiency (%) |
|---|---|---|---|---|
| PLP01, 5A-5C | Low pressure design | 8.5 | 8.4 | 54 |
| PTPHP03, 4A-4C | High pressure design | 31.2 | 41.9 | 36 |
| MPP02, 6A-6C | High peak pressure plus low FOD pressure & area | 17.1 | 20.7 | 85 |

-continued

| air bearing surface test designator, FIGURES | Remarks | Peak Pressure (ID) | Peak Pressure (OD) | FOD efficiency (%) |
|---|---|---|---|---|
| PBA01, 7A-7C | High peak pressure off the FOD area | 15.4 | 15.8 | 54 |
| PBA02, 8A-8C | Peak pressure off the FOD Area | 9.0 | 12.5 | 67 |

Table 1: shows designations for the specific air bearing surfaces tested, their Figures, overall remarks about each surface, the peak air pressure (Unit: atm) at the Inside Diameter (ID), the peak air pressure at the Outside Diameter (OD) and the FOD efficiency in percent. These designations will also be used in FIGS. 9A to 10A for versions of the test air bearing surfaces which could be used in a hard disk drive 10 employing a ramp parking mechanism for the 10 sliders.

FIGS. 4A, 5A, 6A, 7A and 8A show the air bearing surface outlines seen projected on the XY plane.

FIGS. 4B, 5B, 6B, 7B and 8B show the high pressure areas overlaid on the air bearing surface outline. The air bearing surface is outlined with dotted lines, and the high pressure areas are shown with solid lines. The thicker the solid lines, the higher the pressure of that region.

FIGS. 4C, 5C, 6C, 7C and 8C show a map of the high pressure areas as functions of the two dimensional space. Each air bearing surface extends roughly 1.5 millimeters in the x direction and 1 millimeter in the y direction. The high pressure areas are shown as peaks rising in the third dimension, which represents pressure.

FIGS. 4A to 4C show a high peak pressure air bearing design referred to in Table 1 as "PTPH03". The high peak air bearing pressure is located around the FOD affecting area A, which leads to the lowest FOD efficiency.

FIGS. 5A to 5C show a low peak pressure air bearing design referred to in Table 1 as "PLP01". The low peak air bearing pressure is located around the FOD affecting area A, which leads to higher FOD efficiency than the high pressure design such as PTPH03.

FIGS. 6A to 6F show a high peak pressure air bearing design with small pressure over the FOD affected area, which has much higher FOD efficiency than the other air bearing surfaces. This air bearing surface is referred to in Table 1 as "MPP02". The air bearing surface 92 includes a rectangular pressure altering structure 604 with two extensions of unequal length extending toward a leading edge of the air bearing surface 92 separated from the FOD protrusion. The rectangular pressure altering structure 604 is positioned between the two outboard pressure structures and between the FOD protrusion and a leading edge of the air bearing surface 92 and has a peak pressure area over the rectangular pressure altering structure 604. FIGS. 6D shows the approximate location on the MPP02 air bearing surface 92 including the means for minimizing 910 the peak pressure pp under the FOD protrusion 92F0D. FIG. 6E shows the approximate location of the means for placing 920 the peak pressure off of the FOD area AFOD. And FIG. 6F shows the approximate location for the means for shrinking 930 the high peak pressure area HPPA.

FIGS. 7A to 7C show an air bearing design referred to in Table 1 as "PBA01". The high peak air bearing pressure is located off the FOD affecting area A, with low small pressure in the FOD affected area, which leads to a high FOD efficiency compared with designs with similar high peak pressure. The air bearing surface 92 can include two outboard pressure structures 702 located near the trailing edge of the air bearing surface 92. The air bearing surface 92 can include pressure altering structures 704 between the two outboard pressure structures 702 and the POD protrusion 97FOD, having two peak pressure areas on opposite sides of the FOD protrusion 97FOD.

FIGS. 8A to 8C show an air bearing design referred to in Table 1 as "PBA02". The air bearing surface has a high peak air bearing pressure which is asymmetrically arranged off of the FOD affecting area, with a small pressure in the FOD affecting area, which leads to the second highest FOD efficiency.

FIGS. 9A to 10A show the FOD efficiency versus the POD protrusion for these various air bearing surfaces. The vertical axis 800 of each of these Figures represents the FOD efficiency in percent and the horizontal axis 802 represents the FOD protrusion in nanometers. FIG. 9A shows the results of experiments performed at the inside diameter ID of the rotating disk surface 120-1 of the hard disk drive 10. FIG. 9B shows the results of experiments performed at the middle diameter MD of the rotating disk surface 120-1 of the hard disk drive 10. FIG. 10A shows the results of experiments performed at the outside diameter OD of the rotating disk surface 120-1 of the hard disk drive 10.

Each air bearing surface 92 shown in FIGS. 4A to 8C are intended for use in Contact Start-Stop hard disk drives, and each include at least one Pad with Diamond-like Carbon PDLC, which is referred to in the Figures as a pad PDLC. One skilled in the art will recognize that similar results would be found for air bearing surfaces intended for use in hard disk drives which park their read-write heads on ramps away from the disk surfaces. The reason for this can be seen by example the peak air flow maps of each of these air bearing surfaces. None of the pad PDLC is near either the peak pressure areas or the FOD affecting area, consequently similar results can be predicted for similar air bearing surfaces.

By way of example, FIGS. 11 A to 12A show the corresponding air bearing surface 92 without a single pad PDLC for the testing air bearing surfaces. FIG. 11A shows the version of PTPH03 of FIGS. 4A to 4C. FIG. 11B shows the version of PLP01 of FIGS. 5A to 5C. FIG. 11C shows the version of MPP02 of FIGS. 6A to 6C. FIG. 11D shows the version of PBA01 of FIGS. 7A to 7C. FIG. 12A shows the version of PBA02 of FIGS. 8A to 8C.

A method of manufacturing the slider may include manufacturing the air bearing surface with the means for controlling airflow over the air bearing surface during the FOD operation of the slider over the rotating disk surface to maximize the FOD efficiency to create the slider. Alternatively, the method of manufacturing the slider may include manufacturing the air bearing surface with the means for minimizing, the means for placing, and the means for shrinking, to create the slider. The slider is a product of either of these processes or their equivalents.

The head gimbal assembly 60 may further include a micro-actuator assembly 80 coupled with the slider 90 to alter the lateral position LP of the slider over a rotating disk surface 120 as shown in FIGS. 10B and 13A. The micro-actuator assembly may further, alter the vertical position Vp of the slider. The head gimbal assembly may further include a pitch actuator PAA coupled to the flexure finger 20 to attach the flexure finger to the load beam 74 to alter the pitch angle PA of the slider to the rotating disk surface, as shown in FIGS. 12B and 3A.

Manufacturing the head gimbal assembly 60 may include coupling an embodiment of the slider 90 through the flexure finger 20 to the load beam 74 to create the head gimbal assembly. The head gimbal assembly is a product of the invention's manufacturing process.

In greater detail, an embodiment of the micro-actuator assembly 80 employing a piezoelectric effect and/or a thermo-mechanical effect is shown in FIG. 10B. An embodiment of the micro-actuator assembly employing an electrostatic effect is shown in FIG. 14A and in greater detail in FIG. 14B, which includes an electrostatic micro-actuator assembly 2000. Each of these embodiments of the micro-actuator assembly couples a slider 90 with a flexure finger 20 and a load beam 74.

The electrostatic micro-actuator assembly 2000 may preferably include a first micro-actuator 220. The first micro-actuator 220 includes the following: A first pivot spring pair 402 and 408 coupling to a first stator 230. A second pivot spring pair 400 and 406 coupling to a second stator 250. A first flexure spring pair 410 and 416, and a second flexure spring pair 412 and 418, coupling to a central movable section 300. A pitch spring pair 420-422 coupling to the central movable section 300. The central movable section 300 includes signal pair paths coupling to the read differential signal pair and the write differential signal pair of the read-write head 10 of the slider 100. The bonding block 210 preferably electrically couples the read-write head to the read-differential signal pair path and the write-differential signal pair path. The bonding block mechanically couples the central movable section to the slider, which includes the read-write head.

The first micro-actuator 220 can provide lateral motion, which can be finely controlled to position the read-write head 90 over a small number of tracks on a rotating disk surface 120-1. This lateral motion is a first mechanical degree of freedom, which results from the first stator 230 and the second stator 250 electrostatically interacting with the central movable section 300. The first micro-actuator may act as a lateral comb drive or a transverse comb drive.

The electrostatic micro-actuator assembly 2000 may further include a second micro-actuator 520 including a third stator 500 and a fourth stator 550. Both third stator 500 and the fourth stator 550 electostatically interact with the central movable section 300. These interactions urge the slider 90 to move in a second mechanical degree of freedom, which can provide flying height control. The second micro-actuator may act as a vertical comb drive or a torsional drive. The second micro-actuator may also provide motion sensing, which may indicate collision with the rotating disk surface 120-1 being accessed.

The head stack assembly may preferably include a head stack coupling to at least one of these head gimbal assemblies. In certain embodiments, the head stack assembly may include the head stack coupling to at least two of these head gimbal assemblies.

In greater detail, the head gimbal assembly 60 may further include the load tab 78 coupling through a load beam 74 to engage the slider 90, where the load tab contacts the tab ramp away from the slider, as shown in FIG. 12B. Alternatively, the load tab contacts a load ramp toward the slider, to lift the slider away from the disk surface, rather than securing contact with it. Manufacturing the head gimbal assembly may include coupling the load beam including the load tab through a flexure finger 20 to the slider to create the head gimbal assembly as the product of that process.

A disk clamp 300 may support parking a slider 90 on a disk surface 120 by including a third tab ramp. The spindle motor 270 may support parking the sliders on disk surfaces by including a fourth tab ramp. The disk spacer 310 may also support this parking method by including a third tab ramp radially mounted to a fourth tab ramp, which form a radially symmetric triangular extension from the disk spacer about the spindle shaft center 42.

Manufacturing the head stack assembly may include by coupling the head stack to the at least one head gimbal assembly to create the head stack assembly. The head stack assembly is a product of this process. The coupling of the head stack to the head gimbal assembly is typically and preferably performed by swaging the load beam of each head gimbal assembly to an actuator arm of the head stack. Each actuator arm of the head stack is typically coupled to one or two of the head gimbal assemblies.

The hard disk drive includes the head stack assembly pivotably mounted through its actuator pivot to a disk base including at least one disk rotating coupled to a spindle motor also mounted to the disk base. The hard disk drive may employ a Contact Start-Stop (CSS) parking mechanism for the slider on the disk surface or employ a ramp parking mechanism for the slider off the disk surface. Detailed simulations were performed by the inventor using air bearing surfaces for sliders of a CSS hard disk drive, and a discussion of similar air bearing surfaces for ramp parking hard disk drives will show that similar results can reasonably be expected by one skilled in the art.

Manufacturing the hard disk drive may include pivotably mounting the head stack assembly through the actuator pivot to the disk base configured with the at least one disk rotatably coupled to the spindle motor providing the rotating disk surface near the slider to create the hard disk drive. The hard disk drive is a product of this process.

In normal operation the head stack assembly 50 pivots through an actuator pivot 58 to position at least one read-write head 94, embedded in a slider 90, over a rotating disk surface 120. The data stored on the rotating disk surface is typically arranged in concentric tracks. To access the data of a track 122, a servo controller first positions the read-write head by electrically stimulating the voice coil motor 30, which couples through the voice coil 32 and an actuator arm 52 to move a head gimbal assembly 60 in lateral positioning the slider close to the track as shown in FIG. 2A. Once the read-write head is close to the track, the servo controller typically enters an operational mode known herein as track following. It is during track following mode that the read-write head is used to access the data stored of the track.

In further detail, FIG. 10B shows a side view of the head gimbal assembly 60 with a micro-actuator assembly 80 for aiding in laterally positioning of the slider 90. In certain embodiments, the micro-actuator assembly may employ a piezoelectric effect, an electrostatic effect and/or a thermal mechanical effect. The head gimbal assembly may preferably includes a base plate 72 coupled through a hinge 70 to the load beam 74. Often the flexure finger 20 is coupled to the load beam and the micro-actuator assembly 80 and slider 90 are coupled through the flexure finger to the head gimbal assembly.

The head stack assembly 50 containing at least one head gimbal assembly 60 coupled to a head stack 54 by at least one actuator arm 52. The head stack assembly 50 may include more than one head gimbal assembly 60 coupled to the head stack 54.

The preceding embodiments provide examples of the invention and are not meant to constrain the scope of the following claims.

What is claimed is:

1. A slider, comprising:
   a micro-actuator assembly;

an air bearing surface having two outboard pressure structures, connected to the micro-actuator assembly, for altering a vertical position of the air bearing surface;

a Flying height On Demand (FOD) protrusion positioned near the center of a trailing edge of the air bearing surface, for changing an air bearing pressure; and a rectangular pressure altering structure with two unequal length extensions extending toward a leading edge of the air bearing surface and separated from the FOD protrusion, positioned between the two outboard pressure structures and the FOD protrusion, having a peak pressure area over the pressure altering structure, the rectangular pressure altering structure for altering the peak pressure area.

2. The slider of claim 1, wherein said air bearing surface includes at least one pad with diamond-like carbon.

3. The slider of claim 1, further comprising: a read head, coupled to the air bearing surface, with a spin valve or a tunneling valve.

4. The slider of claim 1, further comprising:

a vertical micro-actuator for providing said FOD protrusion, employing at least one member of the group consisting of: a thermal-mechanical effect; a piezoelectric effect; and an electrostatic effect.

5. A head gimbal assembly, comprising:

said slider of claim 1;

a flexure finger coupled to said slider; and a load beam coupled to the said slider through the flexure finger.

6. The head gimbal assembly of claim 5, further comprising:

a micro-actuator assembly, coupled with said slider, for altering a lateral position of said slider over said rotating disk surface.

7. The head gimbal assembly of claim 6, wherein said micro-actuator assembly for operating under stimulus to further alter a vertical position of said slider over said rotating disk surface.

8. The head gimbal assembly of claim 6, wherein said micro-actuator assembly employs at least one member of the group consisting of: a thermal-mechanical effect, a piezoelectric effect, and an electrostatic effect.

9. The head gimbal assembly of claim 5, further comprising: a pitch actuator, coupled to said flexure finger, for attaching said flexure finger to said load beam to alter a pitch angle of said slider to said rotating disk surface.

10. A head stack assembly, comprising: a head stack coupling to at least one of said head gimbal assemblies of claim 5.

11. The head stack assembly of claim 10, wherein said head stack coupling to at least two of said head gimbal assemblies.

12. A hard disk drive, comprising:

said stack assembly of claim 10 pivotably mounted through an actuator pivot;

a disk base coupled to the actuator pivot;

a spindle motor, coupled to the disk base; and at least one disk rotatably coupling to the spindle motor for providing said rotating disk surface near said slider.

13. The hard disk drive of claim 12, wherein said hard disk drive employs a Contact Start-Stop (CSS) parking mechanism for said slider on said disk surface.

14. The hard disk drive of claim 12, wherein said hard disk drive employs a ramp parking mechanism for said slider off said disk surface.

15. A method of manufacturing of said hard disk drive of claim 12 comprising:

pivotably mounting said head stack assembly through said actuator pivot to said disk base configured with said at least one disk rotatably coupled to said spindle motor providing said rotating disk surface near said slider to create said hard disk drive;

coupling said head stack to said at least one head gimbal assembly to create said head stack assembly; and coupling said slider through said flexure finger to said load beam to create said head gimbal assembly.

* * * * *